US009853269B2

(12) United States Patent
Tang et al.

(10) Patent No.: US 9,853,269 B2
(45) Date of Patent: Dec. 26, 2017

(54) ELECTRICAL INSULATION LAYER AND BATTERY DEVICE

(71) Applicants: SEKISUI CHEMICAL CO., LTD., Osaka (JP); UNIVERSITY OF MASSACHUSETTS

(72) Inventors: Yuying Tang, Hadley, MA (US); James Watkins, Hadley, MA (US); Kenichi Shinmei, Kashiwa (JP); Rasika Dasanayake Aluthge, Tokyo (JP); Susumu Koizumi, Ushiku (JP); Masashi Kanoh, Tsukubamirai (JP)

(73) Assignees: SEKISUI CHEMICAL CO., LTD., Osaka (JP); THE UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 14/556,449

(22) Filed: Dec. 1, 2014

(65) Prior Publication Data
US 2015/0155538 A1  Jun. 4, 2015

Related U.S. Application Data

(60) Provisional application No. 61/911,104, filed on Dec. 3, 2013.

(51) Int. Cl.
*H01M 2/16* (2006.01)
*H01M 10/0525* (2010.01)
(Continued)

(52) U.S. Cl.
CPC ......... *H01M 2/1646* (2013.01); *H01M 2/166* (2013.01); *H01M 2/1653* (2013.01);
(Continued)

(58) Field of Classification Search
CPC .. H01M 2/1646; H01M 2/1653; H01M 2/166; H01M 10/0525; H01M 10/0568;
(Continued)

(56) References Cited

U.S. PATENT DOCUMENTS 5,296,318 A   3/1994  Gozdz et al.
5,585,039 A  12/1996  Matsumoto et al.
(Continued)

FOREIGN PATENT DOCUMENTS

CN   101861667 A   10/2010
CN   102738425 A   10/2012
(Continued)

OTHER PUBLICATIONS

J-PlatPat Machine Translation of the detailed description of JP 2005-327680A (Nov. 2005).*
(Continued)

*Primary Examiner* — Gregg Cantelmo
(74) *Attorney, Agent, or Firm* — Greenblum & Bernstein, P.L.C.

(57) ABSTRACT

An electrical insulation layer including microparticles and having a mesoporous structure; and a battery device including a cathode, an anode, an electrical insulation layer including microparticles and having a mesoporous structure, the electrical insulation layer being arranged between the anode and the cathode, and an ion conductive composition.

18 Claims, 2 Drawing Sheets

(51) Int. Cl.
  *H01M 10/0568* (2010.01)
  *H01M 10/0569* (2010.01)
  *H01M 2/14* (2006.01)

(52) U.S. Cl.
  CPC ..... *H01M 2/1673* (2013.01); *H01M 10/0525* (2013.01); *H01M 10/0568* (2013.01); *H01M 10/0569* (2013.01); *H01M 2/145* (2013.01); *H01M 2300/0028* (2013.01); *Y02T 10/7011* (2013.01)

(58) Field of Classification Search
  CPC ...... H01M 10/0569; H01M 2300/0028; Y02T 10/7011
  See application file for complete search history.

(56) References Cited

U.S. PATENT DOCUMENTS

| | | | |
|---|---|---|---|
| 5,705,292 | A | 1/1998 | Yukita et al. |
| 6,410,182 | B1 | 6/2002 | Ying et al. |
| 6,645,675 | B1 | 11/2003 | Munshi |
| 7,790,321 | B2 | 9/2010 | Hennige et al. |
| 2007/0189959 | A1 | 8/2007 | Carlson et al. |
| 2009/0104523 | A1 | 4/2009 | Mullin et al. |

FOREIGN PATENT DOCUMENTS

| | | | | |
|---|---|---|---|---|
| JP | 2004-533702 | A | 11/2004 | |
| JP | 2005-243303 | A | 9/2005 | |
| JP | 2005-327680 | A | 11/2005 | |
| JP | 2008-027839 | A | 2/2008 | |
| JP | 2008-091192 | A | 4/2008 | |
| JP | 2011-222473 | A | 11/2011 | |
| JP | 2013-72737 | A | 4/2013 | |
| JP | 2013-073737 | A | 4/2013 | |
| JP | 2013-182735 | A | 9/2013 | |
| JP | 2013-209355 | A | 10/2013 | |
| WO | 02/075826 | A2 | 9/2002 | |
| WO | WO 2011063132 | A1 * | 5/2011 | ............ H01M 2/166 |
| WO | 2012/106598 | A2 | 8/2012 | |

OTHER PUBLICATIONS

International search report for application No. PCT/JP2014/082601, dated Mar. 17, 2015.
Office Action issued in Chinese Counterpart Application No. 201480066242.9, dated Feb. 13, 2017, with English translation.
Extended European Search Report in respect to European Application No. 14867912.9, dated May 19, 2017.
Abu-Lebdeh et al., "High-Voltage Electrolytes Based on Adiponitrile for Li-Ion Batteries", Journal of the Electrochemical Society, Electrochemical Society, Inc., US, vol. 156, No. 1, Jan. 1, 2009, pp. A60-A65.
Abu-Lebdeh et al., "New electrolytes based on glutaronitrile for High energy/power Li-ion batteries", Journal of Power Sources, Elsevier SA, CH, vol. 189, No. 1, Apr. 1, 2009, pp. 576-579.
Office Action issued in Chinese Application No. 201480066242.9, dated Aug. 8, 2017, with English translation.
New Energy Materials, Wu Qisheng, pp. 69-70, East China University of Science and Technology Press, Apr. 30, 2012 w/ partial English translation.

* cited by examiner

ELECTRICAL INSULATION LAYER AND BATTERY DEVICE

PRIORITY CLAIMS AND RELATED APPLICATIONS

This application claims the benefit of U.S. Provisional Application No. 61/911,104, filed Dec. 3, 2013, the entire content of which is incorporated herein by reference in its entirety.

GOVERNMENT RIGHTS

The United States Government has certain rights to the invention pursuant to Grant No. CMMI-0531171 from the National Science Foundation to the University of Massachusetts.

FIELD OF THE INVENTION

The present invention relates to an electrical insulation layer exhibiting an excellent ion conductivity, and a battery device provided with the electrical insulation layer.

DESCRIPTION OF RELATED ART

Conventionally, between a cathode and an anode constituting a lithium ion secondary battery, a porous membrane having an electrolyte impregnated is used as a separator. However, lithium dendrites having a large surface area is formed, which may become a cause of an electric short circuit within the battery. As a method of preventing the short circuit, there are known a method in which the material for the anode is changed from a lithium metal to carbon black or the like in which lithium ion can be inserted, and a method in which a solid electrolyte is used. For example, as a matrix polymer constituting a solid electrolyte, homopolymers and copolymers of polyethylene oxide, polyacrylonitrile, polysiloxane and the like have been proposed (see Patent Literatures 1 and 2). However, it was difficult for these polymer electrolytes (solid electrolytes) to maintain both of a high conductivity and an excellent mechanical strength. Addition of inorganic nanoparticles such as silica, alumina, titania or the like has been proposed to improve the mechanical strength of the polymer electrolyte (see Patent Literature 3). However, the ion conductivity at room temperature was still unsatisfactory.

Further, a gel electrolyte (polymer gel) which is an intermediate form of an electrolyte solution and a solid electrolyte has been developed (for example, see Patent Literature 4). In a composite gel electrolyte of such a polymer and a solvent, a lithium ion conductivity of $10^{-5}$ to $10^{-3}$ S/cm has been achieved.

In a conventional lithium ion secondary battery using an electrolyte solution or a gel electrolyte, in order to electrically insulate the anode and the cathode, a porous separator is used. A typical separator is composed of a single or multiple layer of a polyolefin film (layer) such as polyethylene or polypropylene. However, these polyolefin separators pose problem that heat shrinkage occurs with temperature rise, so that the heat stability is low. Further, in the case where a lithium ion secondary battery is rapidly charged, or a lithium ion secondary battery is used in a low temperature environment, even when an anode utilizing carbon black is used, lithium dendrites are generated on the anode, so as to cause local electric short circuit. In such a case, the polyolefin separator would melt, and when the melting spreads, a problem arises in that the battery would be in an unstable, dangerous state. For solving such problems, a heat resistant, heat insulating layer constituted of at least one ceramic powder selected from a metal oxide, a metal carbonate and a metal nitride has been proposed which is provided on either or both of the anode and the cathode by plasma spraying (see Patent Literature 5). Furthermore, there has been proposed a double-layered separator constituted of a porous pseudo-boehmite layer and a ultraviolet curable polymer protection coating layer (see Patent Literatures 6 and 7) and a separator formed by covering a porous polyolefin film with a metal oxide layer (see Patent Literature 8).

DOCUMENTS OF RELATED ART

Patent Literature

[Patent Literature1] U.S. Pat. No. 5,585,039
[Patent Literature2] U.S. Pre-Grant Publication No. 2009/0104523
[Patent Literature3] U.S. Pat. No. 6,645,675
[Patent Literature4] U.S. Pat. No. 5,296,318
[Patent Literature5] U.S. Pat. No. 5,705,292
[Patent Literature6] U.S. Pat. No. 6,410,182
[Patent Literature7] U.S. Pre-Grant Publication No. 2007/0189959
[Patent Literature8] U.S. Pat. No. 7,790,321

SUMMARY OF THE INVENTION

In a conventional lithium ion secondary battery device, in the case where a solid electrolyte is used, there was a problem that the ion conductivity was unsatisfactory at room temperature. Further, in the case where an electrolyte solution or a gel electrolyte is used, by the use of a polyolefin separator, there were problems such as shrinkage of the separator at high temperatures and generation of electric short circuit caused by rapid charging or formation of lithium dendrites in a low temperature environment. In addition, since a polyolefin separator does not have a high affinity for an electrolyte solution, the storage properties of the electrolyte solution become poor. As a result, there was a problem that, when the position of the lithium ion secondary battery is fixed in a certain direction over a long time, the electrolyte solution inside the separator is biased, such that the battery cannot be charged/discharged. This bias of the electrolyte solution becomes a serious problem especially in stationary applications in houses and plants and electric vehicle applications.

The present invention takes the above circumstances into consideration, with an object of providing an electrical insulation layer usable instead of a polyolefin separator and exhibiting excellent ion conductivity, mechanical strength and retention of an electrolyte solution, and a battery device provided with the electrical insulation layer and exhibiting excellent battery properties.

(1) An electrical insulation layer including microparticles and having a mesoporous structure.
(2) The electrical insulation layer according to (1) above, wherein the proportion of pores based on the total volume of the electrical insulation layer is 30 to 90 vol %.
(3) The electrical insulation layer according to (1) or (2) above, wherein the proportion of mesopores based on the total volume of the electrical insulation layer is 3 to 65 vol %.

(4) The electrical insulation layer according to any one of (1) to (3) above, further including nanoparticles, wherein at least one of the microparticles and the nanoparticles has a mesoporous structure.

(5) The electrical insulation layer according to any one of (1) to (4) above, further including a binder.

(6) The electrical insulation layer according to any one of (1) to (5) above, further including an ion conductive composition.

(7) A battery device including: a cathode; an anode; an electrical insulation layer including microparticles and having a mesoporous structure, the electrical insulation layer being arranged between the anode and the cathode; and an ion conductive composition.

(8) The battery device according to (7) above, wherein the proportion of pores based on the total volume of the electrical insulation layer is 30 to 90 vol %.

(9) The battery device according to (7) or (8) above, wherein the proportion of mesopores based on the total volume of the electrical insulation layer is 3 to 65 vol %.

(10) The battery device according to any one of (7) to (9) above, wherein the electrical insulation layer further includes nanoparticles, wherein at least one of the microparticles and the nanoparticles has a mesoporous structure.

(11) The battery device according to any one of (7) to (10) above, wherein the electrical insulation layer further includes a binder.

(12) The battery device according to any one of (7) to (11) above, wherein the ion conductive composition includes a lithium salt and a non-aqueous solvent.

(13) The battery device according to (12) above, wherein the lithium salt includes an organic acid lithium-boron trifluoride complex represented by general formula (I) or (II) shown below:

$$[R(COO)_n{}^-Li_n]-BF_{3n} \qquad (I)$$

$$[(COO)_2{}^-Li_2]-(BF_3)_2 \qquad (II)$$

wherein R represents a hydrocarbon group having a valency of n or a hydride group; and n represents an integer of 1 to 4.

(14) The battery device according to (13) above, wherein the organic acid lithium-boron trifluoride complex includes at least one member selected from the group consisting of a lithium oxalate-boron trifluoride complex, a lithium succinate-boron trifluoride complex and a lithium formate-boron trifluoride complex.

(15) The battery device according to (13) or (14) above, wherein the amount of the organic acid lithium-boron trifluoride complex based on the total amount of the lithium salt is 0.5 mol % or more.

(16) The battery device according to any one of (12) to (15) above, wherein the non-aqueous solvent comprises a nitrile solvent.

(17) The battery device according to (16) above, wherein the nitrile solvent includes at least one member selected from the group consisting of succinonitrile, glutaronitrile and adiponitrile.

(18) The battery device according to (16) or (17) above, wherein the amount of the nitrile solvent based on the total amount of the non-aqueous solvent is 50 vol % or more.

(19) The battery device according any one of (7) to (18) above, wherein the microparticles include particles of at least one member selected from the group consisting of polymethylurea, melamine formaldehyde resin, lithium polyacrylate, polyamide, poly(lithium 2-acrylamido-2-methylpropanesulfonate), silicon dioxide ($SiO_2$), aluminum oxide ($Al_2O_3$), pseudoboehmite ($AlO(OH)$), titanium dioxide ($TiO_2$), zinc oxide ($ZnO$), potassium fluoride ($KF$), lithium fluoride ($LiF$), zeolite and calcium carbonate ($CaCO_3$).

(20) The battery device according to any one of (10) to (19) above, wherein the nanoparticles include particles of at least one member selected from the group consisting of silicon dioxide ($SiO_2$), aluminum oxide ($Al_2O_3$), pseudoboehmite ($AlO(OH)$), niobium oxide ($Nb_2O_5$), tantalum oxide ($Ta_2O_5$), titanium dioxide ($TiO_2$), zirconium oxide ($ZrO_2$), tin dioxide ($SnO_2$), zinc oxide ($ZnO$), potassium fluoride ($KF$), lithium fluoride ($LiF$), mesoporous aluminosilicate ($Al_2SiO_5$), a mesoporous niobium-tantalum composite oxide and a mesoporous magnesium-tantalum composite oxide.

(21) The battery device according to any one of (11) to (20) above, wherein the binder includes at least one member selected from the group consisting of polyvinyl alcohol, carboxyl group-modified polyvinyl alcohol, polyvinyl pyrrolidone, polyethylene oxide, polypropylene oxide, polyvinylidene fluoride, polyvinylidene fluoride-hexafluoropropylene copolymer, polyacrylic acid, lithium polyacrylate, poly(methyl methacrylate), poly(butyl acrylate), ethyl hydroxyethyl cellulose, styrene-butadiene resin, carboxymethyl cellulose, polyimide, polyacrylonitrile, polyurethane, ethyl-vinyl acetate copolymer and polyester.

(22) The battery device according to any one of (7) to (21) above, wherein the electrical insulation layer is formed on a surface of at least the anode or the cathode.

The electrical insulation layer of the present invention exhibits excellent electrical insulation properties, ion conductivity, mechanical strength and retention of the electrolyte solution. Therefore, by using the electrical insulation layer as a separator for preventing short circuit of the anode and the cathode of the battery, a battery device exhibiting excellent battery properties can be obtained.

The battery device of the present invention exhibits excellent volume retention and hardly suffers generation of bias of the electrolyte solution inside the battery. Therefore, the battery device of the present invention is preferable in stationary applications in houses and plants and electric vehicle applications.

DETAILED DESCRIPTION OF THE INVENTION

Figure 1:
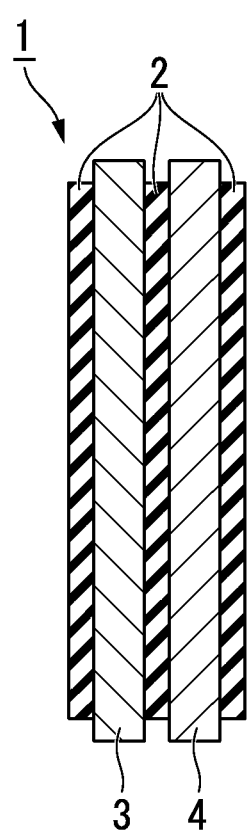
FIG. 1 is a schematic diagram showing a front view of a main part of a battery device according to one embodiment of the present invention.

A first aspect of the present invention is an electrical insulation layer including microparticles and having a mesoporous structure.

A second aspect of the present invention is a battery device including: a cathode; an anode; the electrical insulation layer according to the first aspect arranged between the anode and the cathode; and an ion conductive composition.

Hereinbelow, preferable embodiments of the electrical insulation layer and the battery device will be described.

The electrical insulation layer includes fine particles. The fine particles include at least one kind of microparticles, and may include two or more kinds of microparticles. Further, the fine particles may include at least one kind of nanoparticles described later.

By virtue of the electrical insulation layer including microparticles, the ion conductivity and the mechanical strength of the electrical insulation layer can be improved.

In the present specification and claims, "microparticles" refer to fine particles having an average particle diameter of 0.5 µm to 999 µm. "Nanoparticles" described later and "microparticles" are distinguishable from each other by the difference in the average particle diameters. In the present specification and claims, "microparticles" may be referred to as "first fine particles". Further, "nanoparticles" may be referred to as "second fine particles".

The average particle diameter of the microparticles or the nanoparticles defined in the present specification and claims may be a primary particle diameter or a secondary particle diameter. In the case where the fine particles are agglomerated to form secondary particles in the production of the electrical insulation layer, the average particle diameter of the fine particles is preferably the secondary particle diameter. In the case where the fine particles are not agglomerated so as to be in the form of primary particles in the production of the electrical insulation layer, the average particle diameter of the fine particles is preferably the primary particle diameter.

The average particle diameter of the microparticles is preferably 0.5 m to 40 µm, more preferably 0.7 µm to 30 µm, and still more preferably 0.8 µm to 20 µm.

When the average particle diameter is 0.5 µm to 40 µm, it is preferable that the mechanical strength of the electrical insulation layer becomes excellent, and also, the porosity can be increased so as to reliably improve the ion conductivity.

In the present specification and claims, "average particle diameter (average particle size)" refers to the particle diameter (particle size) of a 50% volumetric integrated value in a particle distribution of the fine particles as determined by a laser diffraction scattering method.

The electrical insulation layer has a mesoporous structure. The mesoporous structure is a porous structure constituted by multiple mesopores present in the electrical insulation layer. Herein, mesopores (in general, may also be referred to as mesoporous pores) are the same as defined for the technical term generally used, and generally refers to pores having an opening with a diameter of 2 nm to 50 nm. The multiple mesopores constituting the mesoporous structure preferably has a uniform diameter.

Whether or not the electrical insulation layer has a mesoporous structure can be determined by confirming whether or not multiple pores having a diameter of 2 nm to 50 nm are present by mercury porosimetry (mercury intrusion method).

By virtue of the electrical insulation layer having a mesoporous structure, the retention of the electrolyte solution in the electrical insulation layer can be improved.

The mesoporous structure of the electrical insulation layer may be constituted by the mesopores of the microparticles constituting the electrical insulation layer, the mesopores of the nanoparticles, or the mesopores formed by the voids between the particles when the microparticles and/or the nanoparticles are packed (arranged) within the electrical insulation layer.

In the battery device, the electrical insulation layer is preferably a composite including an ion conductive composition inside thereof. In such a composite, the electrical insulation layer functions as a stable hard shell against heat, and the ion conductive composition functions as a soft layer which conducts ions. In addition, the electrical insulation layer functions as a separator which prevents short circuit of the cathode and the anode of the battery device.

The fine particles are preferably main constitutional components of the electrical insulation layer.

The fine particles are preferably composed of materials which are not dissolved by solvent or heat in the formation of the electrical insulation layer and the following production of the battery device. Further, in the production of the battery device described later, it is preferable to use a solvent which does not dissolve the fine particles.

The mechanism of how the ion conductivity is improved by the microparticles being contained in the electrical insulation layer has not been elucidated yet. However, it is presumed that the diffusion length of ions by the microparticles within the electrical insulation layer becomes short, thereby forming an efficient ion conductive path. Further, it is presumed that, by virtue of the microparticles, the bulk density of the particles within the electrical insulation layer becomes small and the porosity becomes large, thereby increasing the ion diffusion region and forming an efficient ion conductive path.

In contrast, in the case where an electrical insulation layer is formed of only nanoparticles without using microparticles, nanoparticles having a small particle diameter are densely laminated (packed) inside the electrical insulation layer. In such a case, it becomes necessary that ions are transferred through voids of the densely packed nanoparticles. As a result, it is presumed that the distance required to pass through the electrical insulation layer becomes large and the amount of voids for the ion diffusion becomes small, thereby lowering the ion conductivity.

As a mechanism of improving the mechanical strength of the electrical insulation layer by virtue of the microparticles being contained in the electrical insulation layer, it is presumed that the binder described later adheres the microparticles together, so that it is relatively easy to maintain the structure.

In contrast, in the case where an electrical insulation layer is formed of only nanoparticles without using microparticles, the number of particles (number of nanoparticles) per unit volume of the electrical insulation layer becomes large. As a result, it is presumed that it becomes difficult for the binder to adhere and hold all the particles together, thereby lowering the mechanical strength of the electrical insulation layer.

The raw material for the microparticles is not particularly limited, and is preferably an insulator or a semiconductor. Specific examples include organic fine particles such as polymethylurea, melamine formaldehyde resins, lithium polyacrylate, polyamides, and poly(lithium 2-acrylamido-2-methylpropane sulfonate); and inorganic particles such as silicon dioxide (silica, $SiO_2$), aluminum oxide (alumina, $Al_2O_3$), pseudoboehmite (AlO(OH)), titanium dioxide (titania, $TiO_2$), zinc oxide (ZnO), potassium fluoride (KF), lithium fluoride (LiF), clay, zeolite and calcium carbonate ($CaCO_3$).

The organic fine particles may form secondary particles by the primary particles being agglomerated. In particular, fine particles of polymethylurea generally have fine particles having a primary particle diameter of 0.1 μm to 0.5 μm agglomerated to form microparticles having an average particle diameter of about 3.5 μm to 6.5 μm. As a result, although the fine particles of polymethylurea are microparticles which do not have mesopores, fine particles of polymethylurea are particularly suitable for forming an electrical insulation layer having excellent retention of electrolyte solution, high porosity, high surface hardness and flexibility.

As the mechanism of the retention of the electrolyte solution of the electrical insulation layer being improved by virtue of the electrical insulation layer containing fine particles having mesopores, it is presumed that the electrolyte solution is suctioned by the mesopores by a capillary action, thereby firmly holding the electrolyte solution inside the mesopores. Herein, the mesopores have a pore diameter of about 2 nm to 50 nm.

The raw material for the fine particles having mesopores is not particularly limited, and examples thereof include transition metal oxides, such as silicon dioxide (silica, $SiO_2$), aluminum oxide (alumina, $Al_2O_3$), pseudoboehmite (AlO(OH)), niobium oxide ($Nb_2O_5$), tantalum oxide ($Ta_2O_5$), titanium dioxide (titania, $TiO_2$), zirconium oxide ($ZrO_2$), tin dioxide ($SnO_2$) and zinc oxide (ZnO); potassium fluoride (KF); lithium fluoride (LiF); and composite oxides, such as mesoporous aluminosilicate ($Al_2SiO_5$), a mesoporous niobium-tantalum composite oxide and a mesoporous magnesium-tantalum composite oxide.

As the microparticles and the fine particles having mesopores, one kind of particle may be used, or two or more kinds of particles may be used in combination.

The microparticles and the fine particles having mesopores may be fine particles obtainable from the same material, or fine particles obtainable from different materials. For example, in the case where the electrical insulation layer contains two or more kinds of microparticles, microparticles having mesopores and microparticles having no mesopores may be used in combination. Alternatively, in the case where the electrical insulation layer contains one kind of microparticles, the microparticles may or may not have mesopores. When the one kind of microparticles has no mesopores, it is preferable that particles other than the microparticles, e.g., nanoparticles described later have mesopores.

In the case where the microparticles do not have mesopores by themselves, when the microparticles are packed (arranged) in the electrical insulation layer, mesopores may be formed in the voids between the particles. By the presence of a multiple mesopores, a mesoporous structure can be formed within the electrical insulation layer.

The electrical insulation layer may further include nanoparticles. By virtue of including nanoparticles, electric short circuit of the electrical insulation layer (battery device) caused by lithium dendrites formed to penetrate through the electrical insulation layer can be prevented.

The mechanism of how the electric short circuit of the electrical insulation layer can be prevented by the nanoparticles being contained in the electrical insulation layer has not been elucidated yet. However, it is presumed that the nanoparticles coexisting with the microparticles are appropriately packed within the electrical insulation layer, such that lithium dendrites cannot intrude into the electrical insulation layer.

Herein, "nanoparticles" refer to fine particles having an average particle diameter of 3 nm to less than 500 nm.

The average particle diameter of the nanoparticles is preferably 3 nm to less than 500 nm, more preferably 10 nm to 450 nm, and still more preferably 20 nm to 400 nm.

When the average particle diameter is 3 nm to less than 500 nm, it is preferable that the mechanical strength of the electrical insulation layer becomes excellent, and intrusion of lithium dendrites can be greatly suppressed.

Like the microparticles and the fine particles having mesopores, the nanoparticles are preferably composed of materials which are not dissolved by solvent or heat in the formation of the electrical insulation layer and the following production of the battery device. Further, in the production of the battery device described later, it is preferable to use a solvent which does not dissolve the nanoparticles.

The raw material for the nanoparticles is not particularly limited, and preferable examples thereof include the same raw materials as those described above for the fine particles having mesopores.

As the nanoparticles, one kind of particle may be used, or two or more kinds of particles may be used in combination. Further, the nanoparticles may or may not have mesopores. In the case where the electrical insulation layer contains two or more kinds of nanoparticles, nanoparticles having mesopores and nanoparticles having no mesopores may be used in combination. Furthermore, regardless of whether or not the nanoparticles have mesopores, the microparticles may have mesopores.

In the case where the electrical insulation layer contains both the microparticles and the nanoparticles, the weight ratio of the microparticles (M) to the nanoparticles (N) is preferably M:N=99:1 to 1:99. By adjusting M:N, the proportion of pores based on the total volume of the electrical insulation layer (porosity) and the proportion of the mesopores can be adjusted.

The electrical insulation layer preferably further includes a binder, and the fine particles are adhered to each other by the binder. That is, it is preferable that the microparticles constituting the electrical insulation layer are adhered to each other by a binder, and in the case where the electrical insulation layer contains the fine particles having mesopores or the nanoparticles, it is more preferable that the fine particles are adhered to each other together with the microparticles by the binder. By virtue of the fine particles satisfactorily adhered to each other by the binder, the mechanical strength of the electrical insulation layer can be satisfactorily improved.

As the binder for the electrical insulation layer, various oligomers or polymers capable of adhering fine particles and having conventional monomers as the structural units can be used. Examples of the binder include polymers and oligomers obtainable by subjecting at least one member selected from the group consisting of conventional oligomers and monomers to either or both of crosslinking and polymerization.

The binder for the electrical insulation layer is preferably a polymer having a molecular weight (weight average molecular weight Mw) of 5000 to 2,000,000, more preferably a polymer having an Mw of 10,000 to 1,000,000. By virtue of using a polymer having an Mw of 5000 to 2,000, 000, the fine particles constituting the electrical insulation layer are strongly adhered to each other, thereby further improving the mechanical strength of the electrical insulation layer.

Preferable examples of the polymer constituting the binder for the electrical insulation layer include polyvinyl alcohol, carboxyl group-modified polyvinyl alcohol, polyvinyl pyrrolidone, polyethylene oxide, polypropylene oxide, polyvinylidene fluoride, polyvinylidene fluoride-hexafluoropropylene copolymer, polyacrylic acid, lithium polyacrylate, poly(methyl methacrylate), poly(butyl acrylate), ethyl hydroxyethyl cellulose, styrene-butadiene resin, carboxymethyl cellulose, polyimide, polyacrylonitrile, polyurethane, ethyl-vinyl acetate copolymer and polyester.

Further, as the material for the binder, an ultraviolet curable bonder precursor (ultraviolet curable monomer, oligomer or polymer) is also usable. Such an ultraviolet curable bonder precursor can be cured in the production of the electrical insulation layer described later, so as to be used as a binder.

Further, an oligomer having a molecular weight smaller than that of the above polymer such as polyvinyl alcohol can be used for crosslinking or polymerizing the polymers.

Alternatively, monomers constituting the above polymer such as polyvinyl alcohol can be used for crosslinking or polymerizing the polymers.

As the binder for the electrical insulation layer, one kind of compound may be used, or two or more kinds of compounds may be used in combination.

The binder for the electrical insulation layer preferably includes at least one member selected from the group consisting of polyvinyl alcohol, carboxyl group-modified polyvinyl alcohol, polyvinyl pyrrolidone, polyethylene oxide, polypropylene oxide, polyvinylidene fluoride, polyvinylidene fluoride-hexafluoropropylene copolymer, polyacrylic acid, lithium polyacrylate, poly(methyl methacrylate), poly(butyl acrylate), ethyl hydroxyethyl cellulose, styrene-butadiene resin, carboxymethyl cellulose, polyimide, polyacrylonitrile, polyurethane, ethyl-vinyl acetate copolymer and polyester.

The binder for the electrical insulation layer preferably includes at least one member selected from the group consisting of polyvinyl alcohol, polyethylene oxide, polyvinylidene fluoride, polyvinylidene fluoride-hexafluoropropylene copolymer and polyacrylic acid.

The amount of the microparticles based on the total weight of the electrical insulation layer is preferably 5 to 100% by weight, more preferably 10 to 90% by weight, and still more preferably 15 to 85% by weight. When the amount of the microparticles is within the range of 5 to 100% by weight, the ion conductive path which contributes to the improvement in the ion conductivity of the electrical insulation layer can be reliably formed.

The amount of the fine particles having mesopores based on the total weight of the electrical insulation layer is preferably 5 to 100% by weight, and more preferably 10 to 90% by weight. When the amount of the fine particles having mesopores is in the range of 5 to 100% by weight, the mesoporous structure which contributed to improvement in the retention of the electrolyte solution of the electrical insulation layer can be reliably formed.

The amount of the nanoparticles based on the total weight of the electrical insulation layer is preferably 0 to 95% by weight, more preferably 5 to 90% by weight, and still more preferably 10 to 85% by weight. By virtue of including the nanoparticles, lithium ion dendrites can be prevented from intruding into the electrical insulation layer, thereby more reliably preventing electric short circuit.

The amount of the binder based on the total weight of the electrical insulation layer is preferably 5 to 40% by weight, and more preferably 10 to 30% by weight. When the amount of the binder is within the range of 5 to 40% by weight, not only can the mechanical strength of the electrical insulation layer be improved, but also pores for impregnating the electrolyte solution in the electrical insulation layer can be satisfactorily formed.

In the electrical insulation layer, the microparticles and the fine particles having mesopores may be fine particles obtainable from the same material, or fine particles obtainable from different materials.

In the case where the electrical insulation layer contains nanoparticles, the nanoparticles may or may not have mesopores. However, in the case where the microparticles do not have mesopores, it is preferable to include nanoparticles having mesopores as the fine particles having mesopores. The amount of the nanoparticles having mesopores based on the total weight of the electrical insulation layer is preferably 5 to 95% by weight, and more preferably 10 to 90% by weight.

In the case where the nanoparticles do not have mesopores by themselves, when the nanoparticles are packed (arranged) in the electrical insulation layer, mesopores may be formed in the voids between the particles. By the presence of a multiple mesopores, a mesoporous structure may be formed within the electrical insulation layer.

The electrical insulation layer may contain any optional component other than the fine particles and the binder, as long as the effects of the present invention are not impaired. The optional component is not particularly limited.

However, the total amount of the microparticles, the nanoparticles and the binder based on the total weight of the electrical insulation layer is preferably 90% by weight or more, and more preferably 95% by weight or more.

In the electrical insulation layer, the pore diameter of the pore portion is preferably 2 nm to 2,000 nm, and more preferably 5 nm to 1,000 nm. When the pore diameter is at least as large as the above lower limit (i.e., 2 nm or more), the ion conductive composition can be reliably impregnated in the pore portion, thereby improving the ion conductivity of the electrical insulation layer. On the other hand, when the pore diameter is no more than the above upper limit (i.e., 2,000 nm or less), for example, in the case where lithium ions are conducted, growth of lithium dendrite which is the substance causing electric short circuit inside the battery can be greatly suppressed.

Herein, the "pore diameter of pore portion" of the electrical insulation layer refers to the maximum diameter of the pore portions in an image data of the cross-section of the electrical insulation layer obtained by using a scanning electron microscope (SEM) or the like.

Further, "pore portion" refers to portions constituted of pores in the image data, and is mainly constituted of voids between fine particles.

The porosity, i.e., the proportion of pore portions constituting a porous structure based on the total volume of the electrical insulation layer (100 vol %) is preferably 30 to 90 vol %, more preferably 35 to 90 vol %, and still more preferably 40 to 80 vol %.

When the porosity is at least as large as the above lower limit (i.e., 40 vol % or more), the volume of the pore portions is large enough to satisfactorily contain the ion conductive composition in the electrical insulation layer, thereby further improving the ion conductivity of the electrical insulation layer. On the other hand, when the porosity is no more than the above upper limit (i.e., 90 vol % or less), the mechanical strength of the electrical insulation layer is further improved.

In general, the porosity of the electrical insulation layer can be determined by mercury porosimetry (mercury intrusion method), measurement by three-dimensional X ray CT or a method in which the porosity is calculated from the following formula (P1) using the absorption of the solvent such as propylene carbonate (solvent absorption). However, the above range of the porosity is based on values obtained by measuring the solvent absorption and calculated by the following formula (P1).

Porosity (%)={solvent absorption (%)×weight of electrical insulation layer (g)/specific gravity of solvent (g/cm³)}/{solvent absorption (%)× weight of electrical insulation layer (g)/specific gravity of solvent (g/cm³)+volume of electrical insulation layer (cm³)}×100 (P1)

The method of calculating the absorption of solvent (solvent absorption) is as follows.

In the calculation, the proportion of increase in the weight of the electrical insulation layer when propylene carbonate (PC) is impregnated is regarded as the solvent absorption. The proportion of increase is calculated by the following formula (P2).

solvent absorption (%)={(Weight of electrical insulation layer after PC impregnation)−(Weight of electrical insulation layer before PC impregnation)}/(Weight of electrical insulation layer after PC impregnation)×100 (P2)

Specifically, the solvent absorption is determined as follows. Firstly, the weight of the electrical insulation layer before PC impregnation is measured. Then, the electrical insulation layer is immersed in PC at 25° C. for a predetermined time. After sufficiently impregnating PC in the electrical insulation layer by a capillary action, the electrical insulation layer is taken out of PC, and excess solvent was wiped off the surface. The weight of electrical insulation layer after PC impregnation is measured. The measured values are substituted in the above formula (P2), so as to calculate the proportion of the increase in weight.

Based on the total volume of the electrical insulation layer (100 vol %), the mesoporosity, i.e., the proportion of the mesopores constituting the mesoporous structure is preferably 3 vol % or more, and more preferably 5 to 65 vol %. Herein, the above range is based on values measured by the mercury intrusion method.

When the mesoporosity is at least as large as the above lower limit, (i.e., 3 vol % or more), it becomes easy for the electrical insulation layer to stably hold the ion conductive composition in the form of a liquid. On the other hand, when the mesoporosity is no more than the above upper limit (i.e., 65 vol % or less), the mechanical strength of the electrical insulation layer is further improved.

Based on the total volume of the electrical insulation layer (100 vol %), macroporosity, i.e., the proportion of macropores larger than the mesopores is preferably 10 vol % or more, and more preferably 10 to 75 vol %. Herein, the above range is based on values measured by the mercury intrusion method.

When the macroporosity is at least as large as the above lower limit, (i.e., 10 vol % or more), the ion conductivity of the electrical insulation layer can be further improved. On the other hand, when the macroporosity is no more than the above upper limit (i.e., 75 vol % or less), the mechanical strength of the electrical insulation layer is further improved.

The mesoporosity and the macroporosity of the electrical insulation layer can be determined by mercury porosimetry (mercury intrusion method), measurement by three-dimensional X ray CT or a method in which the porosity is calculated from the following formula (P1) using the absorption of the solvent. However, the above ranges of the mesoporosity and the macroporosity are based on values obtained by the mercury porosimetry method.

The electrical insulation layer preferably has a heat resistance to a temperature of at least 200° C. By virtue of the electrical insulation layer having such a high heat resistance, even in the case where the battery generates heat by some cause, the electrical insulation layer can maintain the structure thereof as an insulation layer. The heat resistance of the electrical insulation layer can be adjusted by appropriately selecting the kind and amount of the constitutional component of the electrical insulation layer such as the fine particles and the binder. Herein, "heat resistance" means that no significant change in the properties, e.g., deformation or change in quality is observed when heated at a predetermined temperature.

The ion conductive composition includes ions exhibiting electrical conductivity or an ion source which generates such ions. The ion conductive composition preferably functions as an electrolyte solution, a gel electrolyte or a solid electrolyte of a battery device in the case where the battery device is provided with the electrical insulation layer.

In general, the ion conductive composition is held inside the electrical insulation layer (porous portion of the electrical insulation layer).

The ion conductive composition may be in the form of, for example, solid, wax, gel or liquid. In the case where the ion conductive composition contained in a conventional polyolefin separator is in the form of a liquid or the viscosity of the ion conductive composition is low, when acceleration is applied from the outside (e.g., acceleration in the start of a moving body or a stopping operation), the ion conductive composition may leak out of the polyolefin separator. Further, when a battery provided with a conventional polyolefin separator containing an ion conductive composition (e.g., a stationary power source) is fixed over a long period, in the polyolefin separator inside the battery, the distribution of the ion conductive composition may be biased. In contrast, the electrical insulation layer according to the present invention fine particles having mesopores which constitute a mesoporous structure. Therefore, the ion conductive composition is suppressed from leaking out of the electrical insulation layer, and is very stably held inside the electrical insulation layer (in the pore portions).

As the ion conductive composition, for example, a composition containing a dissociable salt and a solvent component capable of dissolving the dissociable salt is preferable.

The dissociable salt is a salt which generates electrical conductive ions (ion source). In general, the ion is preferably a cation.

The solvent is a liquid capable of becoming a medium for conducting ions.

The kind of the dissociable salt is not particularly limited. In terms of excellent conductivity, a lithium salt is preferable.

In the case where the dissociable salt contains a lithium salt, in terms of improving the battery device properties, the solvent is preferably a non-aqueous solvent.

Preferable examples of the lithium salt include an organic acid lithium-boron trifluoride complex represented by general formula (I):

   (I)

wherein R represents a hydrocarbon group having a valency of n or a hydride group (H⁻); and n represents an integer of 1 to 4, an organic acid lithium-boron trifluoride complex represented by general formula (II):

   (II), lithium bis(trifluoromethanesulphonyl)imide (LiTFSI), lithium tetrafluoroborate, lithium hexafluorophosphate (LiPF$_6$) and lithium bis(fluorosulfonyl)imide (LiFSI).

In general formula (I), R may be a functional group selected from a linear, branched or cyclic hydrocarbon group of 1 to 20 carbon atoms, an aromatic hydrocarbon group of 1 to 20 carbon atoms and a hydride group ($H^-$).

Preferable examples of the organic acid lithium-boron trifluoride complex represented by general formula (I) or (II) include lithium carboxylate-boron trifluoride complexes, such as a lithium oxalate-boron trifluoride complex, a lithium succinate-boron trifluoride complex and a lithium formate-boron trifluoride complex.

As the dissociable salt, one kind of compound may be used, or two or more compounds may be used in combination. For example, the dissociable salt may be constituted of one kind of lithium salt, or a mixture containing two or more kinds of lithium salts. By virtue of the dissociable group containing an organic acid lithium-boron trifluoride complex represented by general formula (I), the ion conductivity and the battery properties can be further improved.

The lithium salt preferably includes at least one member selected from the group consisting of an organic acid lithium-boron trifluoride complex represented by general formula (I), lithium bis(trifluoromethanesulphonyl)imide, lithium tetrafluoroborate, lithium hexafluorophosphate ($LiPF_6$) and lithium bis(fluorosulfonyl)imide.

The amount of the organic acid lithium-boron trifluoride complex represented by general formula (I), based on the total amount of the lithium salt constituting the dissociable salt (provided that the molar percentage of all lithium salts is 100%) is preferably 0.5 mol % or more, and more preferably 2 mol % or more. The upper limit is not particularly limited, and may be 100 mol %.

The concentration of the dissociable salt per 1 kg of the ion conductive composition is preferably 0.5 mol/kg to 3 mol/kg, and more preferably 0.7 mol/kg to 2 mol/kg.

A lithium carboxylate-boron trifluoride complex, such as a lithium oxalate-boron trifluoride complex, a lithium succinate-boron trifluoride complex or a lithium formate-boron trifluoride complex can be obtained by the following production method.

For example, a lithium carboxylate-boron trifluoride complex can be obtained by a production method including a step in which a lithium carboxylate, boron trifluoride and/or a boron trifluoride complex, and a solvent are blended to react the lithium carboxylate with boron trifluoride and/or the boron trifluoride complex (hereafter, abbreviated as the "reaction step") and a step in which the solvent and impurities derived from boron trifluoride and/or the boron trifluoride complex are removed from the reaction solution after the completion of the reaction (hereafter, abbreviated as "removing step"). The lithium carboxylate-boron trifluoride complex obtained by this production method is formed by a complexation reaction of the lithium carboxylate with boron trifluoride and/or the boron trifluoride complex.

In this production method, examples of lithium carboxylate include lithium oxalate, lithium succinate and lithium formate.

Preferable examples of the boron trifluoride complex include alkylether-boron trifluoride complexes, such as a dimethylether-boron trifluoride complex ($BF_3.O(CH_3)_2$), a diethylether-boron trifluoride complex ($BF_3.O(C_2H_5)_2$), a di-n-butylether-boron trifluoride complex ($BF_3.O(C_4H_9)_2$), a di-tert-butylether-boron trifluoride complex ($BF_3.O((CH_3)_3C)_2$), a di-tert-butylmethylether-boron trifluoride complex ($BF_3.O((CH_3)_3C)(CH_3)$) and tetrahydrofuran-boron trifluoride complex ($BF_3.OC_4H_8$); and alcohol-boron trifluoride complexes such as a methanol-boron trifluoride complex ($BF_3.HOCH_3$), a propanol-boron trifluoride complex ($BF_3.HOC_3H_7$) and a phenol-boron trifluoride complex ($BF_3.HOC_6H_5$).

As boron trifluoride and/or boron trifluoride complex, in terms of ease in handling and smoothly advancing the complexation reaction, it is preferable to use the boron trifluoride complex.

The solvent is not particularly limited as long as the solvent does not impede the complexation reaction of lithium carboxylate with boron trifluoride and/or boron trifluoride complex in the reaction step, and the solvent is capable of dissolving these compounds. As the solvent, an organic solvent is preferable, and an organic solvent which can be distilled off under atmospheric pressure or reduced pressure is more preferable.

The boiling point of the solvent is preferably 20° C. or higher, more preferably 30° C. or higher, and most preferably 35° C. or higher. Further, the boiling point of the solvent is preferably 180° C. or lower, more preferably 150° C. or lower, and most preferably 120° C. or lower. When the boiling point of the solvent is at least as large as the above lower limit (i.e., 20° C. or higher), reaction solution in the reaction step can be stirred at room temperature, such that the reaction step can be easily performed. On the other hand, when the boiling point of the solvent is no more than the above upper limit (i.e., 180° C. or lower), the solvent can be easily removed by distillation in the removing step.

Preferable examples of organic solvents usable as the solvent include chain-like carbonate compounds (i.e., compounds having a carbonate bond in a chain-like structure), such as dimethyl carbonate, ethylmethyl carbonate, and diethyl carbonate; nitrile compounds, such as acetonitrile; cyclic ether compounds (i.e., compounds having an ether bond in a ring structure), such as tetrahydrofuran; chain-like ether compounds (i.e., compounds having an ether bond in a chain-like structure), such as diethylether and 1,2-dimethoxyethane; and carboxylate compounds, such as ethyl acetate and isopropyl acetate.

Among these examples, as the organic solvent, a chain-like carbonate compound, a nitrile compound or a cyclic ether compound is preferable.

As the lithium carboxylate, boron trifluoride and/or the boron trifluoride complex, and the solvent, one kind of compound may be used, or two or more kinds of compounds may be used in combination.

In the removing step, examples of the impurities include excess boron trifluoride and/or the boron trifluoride complex which did not react with lithium carboxylate and remained, and by-products generated therefrom. Examples of the by-product include components which were originally bonded through a coordinate bond to boron trifluoride as a raw material for the boron trifluoride complex prior to the reaction. These impurities can be removed by distillation.

In the ion conductive composition, examples of the non-aqueous solvent capable of dissolving the dissociable salt include chain-like carbonates, such as dimethyl carbonate and diethyl carbonate; cyclic carbonates, such as ethylene carbonate and propylene carbonate; lactones, such as gamma-butyrolactone and gamma-valerolactone; and nitriles (nitrile solvents), such as acetonitrile, succinonitrile, glutaronitrile, and adiponitrile.

The amount of the solvent component capable of dissolving the dissociable salt, based on the total weight of the ion conductive composition is preferably 10 to 90% by weight, and more preferably 20 to 90% by weight.

In the case where the ion conductive composition contains a nitrile solvent as the non-aqueous solvent, the amount of the nitrile solvent based on the total amount (total volume) of the non-aqueous solvent is preferably 50 vol % or more. When the amount of the nitrile solvent is at least as large as the above range, the performance of the battery device can be improved.

The ion conductive composition may contain, in addition to the lithium salt and the solvent, at least one viscous component. Herein, a "viscous component" added to the ion conductive composition refers to a component capable of increasing the viscosity of the ion conductive composition.

As the viscous component, oligomers and polymers composed of conventional monomers are preferable. Examples of the viscous component include at least one member selected from the group consisting of polyethylene glycol dimethylether, polyethylene glycol octadecylether, polyethylene oxide, polypropylene oxide, polyvinylidene fluoride, polyvinylidene fluoride-hexafluoropropylene copolymer, a copolymer of ethylene and ethylene oxide, a copolymer of ethylene oxide and propylene oxide, poly(methyl methacrylate), poly(ethyl methacrylate), polyacrylamide, and a polyacrylate containing an ethylene oxide unit.

In the ion conductive composition, as the viscous component, one kind of compound may be used, or two or more kinds of compounds may be used in combination. For example, as the oligomer and the polymer for the viscous component, one kind of oligomer or polymer may be used, or two or more kinds of oligomers and/or polymers may be used in combination.

The amount of the viscous component based on the total weight of the ion conductive composition is preferably 1 to 90% by weight, and more preferably 2 to 80% by weight.

The ion conductive composition may contain, in addition to the dissociable salt, the solvent and the viscous component, an interface coating forming component.

In the case where such an interface coating forming component is used, in an initial charging of the lithium ion secondary battery, the interface coating forming component is reduced on a surface of the anode, and the interface coating forming component forms a solid electrolyte-like interface coating composed of lithium carbonate ($Li_2CO_3$), lithium oxide ($Li_2O$), lithium hydroxide (LiOH) or the like (hereafter, sometimes referred to as "SEI"). As a result, solvent molecules solvating lithium ions can be prevented from being inserted into the anode at the time of charging/discharging, and breaking of the anode structure can be greatly suppressed. Hence, the volume retention is increased in the case where charging/discharging is repeatedly conducted, thereby making it possible to obtain a lithium ion secondary battery with excellent charging/discharging properties.

Preferable examples of the interface coating forming component include vinylene carbonate, vinylethylene carbonate, fluoroethylene carbonate, succinonitrile, glutaronitrile, adiponitrile, dimethyl oxalate, diethyloxalate and 1,3-propanesultone.

The ion conductive composition may contain, in addition to the dissociable salt, the solvent component capable of dissolving the dissociable salt, viscous component and the interface coating forming component, an optional component, as long as the effects of the present invention are not impaired. The optional component is not particularly limited.

However, the total amount of the dissociable salt, the solvent component capable of dissolving the dissociable salt, the viscous component and the interface coating forming component is preferably 90% by weight or more, and more preferably 95% by weight or more.

With respect to the electrolyte obtained by including the ion conductive composition in the electrical insulation layer, by adjusting the combination of the electrical insulation layer and the ion conductive layer, an excellent ion conductivity of $1\times10^{-4}$ S/cm or more can be achieved at room temperature (e.g., 18 to 32° C.). By virtue of such an excellent ion conductivity, the electrolyte can be preferably applied to various battery devices such as lithium ion secondary battery and fuel cell. For example, in the case where the electrolyte is applied to a lithium ion secondary battery, by constituting so as to form SEI on the surface of the anode, it becomes possible to obtain a secondary battery with improved volume retention and excellent charge/discharge properties. Further, by adjusting the composition of the electrical insulation layer, the electrolyte can improve the mechanical strength from room temperature up to a high temperature. In addition, in the case where the electrical insulation layer conducts lithium ion, the structure becomes appropriate for greatly suppressing growth of substance such as lithium dendrite that becomes a cause of electric short circuit in the battery.

<Battery Device>

The battery device according to the present invention is provided with an electrolyte which is the aforementioned electrical insulation layer containing the ion conductive composition, and is preferable as a secondary battery such as a lithium ion secondary battery.

The battery device according to the present invention does not require a polyolefin separator as a constitutional component, and exhibits excellent ion conductivity.

In the battery device according to the present invention, the electrolyte may be used in combination with a conventional separator. However, since the electrical insulation layer constituting the electrolyte functions as a separator, it is not necessary to use a separator. Hereinbelow, an example of a battery device which does not use a conventional separator will be described, but the battery device of the present invention is not limited thereto In the battery device, except for providing the electrolyte instead of a conventional separator, the same configuration as that of a conventional battery device can be used. For example, the battery device according to the present invention can be configured by providing the electrolyte between the anode and the cathode. In a preferred embodiment, for example, a configuration in which the electrolyte having the electrical insulation layer is provided on an electrode surface of either or both of the anode and the cathode (provided with the electrolyte in contact with the electrode surface) can be shown.

In the battery device, the thickness of the electrical insulation layer is not particularly limited, as long as the electrical insulation can be maintained. For example, the thickness may be about the same as that of a conventional polyolefin separator. Specifically, for example, the thickness of the electrical insulation layer is preferably 1 µm to 100 µm, more preferably 2 µm to 20 µm, and still more preferably 3 µm to 10 µm.

When the thickness of the electrical insulation layer is at least as large as the above lower limit (i.e., 1 µm or more), the electrical insulation properties of the electrical insulation layer can be satisfactorily maintained. On the other hand, when the thickness of the electrical insulation layer is no more than the above upper limit (i.e., 100 µm or less), the ion conductivity of the electrical insulation layer can be satisfactorily improved.

The thickness of the electrical insulation layer according to a first aspect of the present invention can be significantly reduced as compared to a conventional polyolefin separator. Specifically, for preventing short circuit of the cathode and the anode, and also maintain the mechanical strength, a conventional separator required a thickness of about 10 to 15 μm. In contrast, the electrical insulation layer according to a first aspect of the present invention can prevent short circuit of the cathode and the anode, and also maintain the mechanical strength necessary to function as a battery with a thickness of 3 to 4 μm.

FIG. 1 is a schematic diagram showing a front view of a main part of a battery device provided with the electrolyte.

The battery device shown in FIG. 1 has sheet-like anode 3 and cathode 4 laminated via a sheet-like electrolyte 2. Although only one anode 3 and one cathode 4 are shown, a configuration may be employed in which the anode 3, the electrolyte 2 and the cathode 4 are laminated in this order to form a repeating unit of a laminate structure, and multiple laminate structures are repeatedly laminated in this order. The electrolyte 2 has the electrical insulation layer and the ion conductive composition. Further, the electrolyte may be a laminate of 2 or more sheets. By providing a wire (not shown) to each of the anode 3 and the cathode 4, an electric current can be obtained from the battery device 1.

The battery device 1 shown here is merely one example of the battery device according to the present invention, and the battery device according to the present invention is not limited thereto.

Hereinbelow, as a preferable battery device, a lithium ion secondary battery will be described.

<Anode>

As the anode, a conventional anode can be suitably used. As a manufacturing method of the anode, for example, there can be mentioned a method in which an anode active material, a binder and a conductive assistant if desired are blended to obtain an anode mixture, a solvent is further blended to produce an anode mixture composition, followed by applying the anode mixture composition to a current collector and drying, thereby producing an anode in which an anode active material layer is formed on the current collector.

Examples of the anode active material include graphite and hard carbon.

Examples of the binder constituting the anode include polyacrylic acid (PAA), lithium polyacrylate (PAALi), polyvinylidene fluoride (PVDF), polyvinylidene fluoride-hexafluoropropylene copolymer (PVDF-HFP), styrene-butadiene rubber (SBR), polyvinyl alcohol (PVA), polyethylene oxide (PEO), polyethylene glycol (PEG), carboxymethylcellulose (CMC), polyacrylonitrile (PAN) and polyimide (PI).

Examples of the conductive assistant constituting the anode include carbon black, such as Ketjen black and acetylene black.

Examples of the solvent constituting the anode include water and organic solvents. Preferable examples of the organic solvent include alcohols, such as methanol, ethanol, 1-propanol and 2-propanol; chain-like or cyclic amides, such as N-methylpyrrolidone (NMP) and N,N-dimethylformamide (DMF); and ketones, such as acetone.

Preferable examples of the material constituting the current collector include electrically conductive metals, such as Copper (Cu), aluminum (Al), titanium (Ti), nickel (Ni) and stainless steel.

As the anode active material, the binder, the conductive assistant and the solvent constituting the anode, one kind of material may be used, or two or more kinds of materials may be used in combination.

<Cathode>

As the cathode, a conventional cathode can be suitably used. As a manufacturing method of the cathode, for example, there can be mentioned a method in which a cathode active material, a binder and a conductive assistant if desired are blended to obtain a cathode mixture, a solvent is further blended to produce a cathode mixture composition, followed by applying the cathode mixture composition to a current collector and drying, thereby producing a cathode in which a cathode active material layer is formed on the current collector.

Examples of the cathode active material include lithium metal oxide compounds represented by general formula: "$LiM_xO_y$ (wherein M represents a metal; x and y represent the compositional ratio of metal M and oxygen O, respectively)".

Examples of the lithium metal oxide compounds include lithium cobalt oxide ($LiCoO_2$), lithium nickel oxide ($LiNiO_2$) and lithium manganese oxide ($LiMn_2O_4$). Alternatively, an olivine lithium iron phosphate ($LiFePO_4$) can also be used.

The lithium metal oxide compound represented by the above general formula may be a compound in which M is a plurality of kinds of metals. Examples of such a lithium metal oxide compound include compounds represented by general formula: "$LiM^1_pM^2_qM^3_rO_y$ (wherein $M^1$, $M^2$ and $M^3$ represent mutually different kinds of metals; and p, q, r and y represent the compositional ratio of the metals $M^1$, $M^2$ and $M^3$ and oxygen O, respectively)". Here, p+q+r=x.

Examples of such a lithium metal oxide compound include $LiNi_{0.33}Mn_{0.33}Co_{0.33}O_2$.

The binder, the conductive assistant, the solvent and the current collector for the cathode are the same as defined for the anode.

As the cathode active material, the binder, the conductive assistant and the solvent constituting the cathode, one kind of material may be used, or two or more kinds of materials may be used in combination.

The battery device according to the present invention can be produced by providing the electrolyte between the anode and the cathode.

<Production Method of Electrolyte Having Ion Conductive Composition Contained in Electrical Insulation Layer, and Production Method of Battery Device Provided with the Electrolyte>

As the production method of the electrolyte, there can be mentioned, for example, a method in which components for constituting the electrical insulation layer (organic fine particles, inorganic fine particles, binder, other optional components) are blended with components for constituting the ion conductive composition (e.g., the dissociable salt, viscous component, component capable of dissolving the dissociable salt, other optional components) to produce an electrolyte composition, and the electrolyte composition is molded into a desired shape, followed by drying, thereby simultaneously forming the electrical insulation layer and the ion conductive composition which constitute the electrolyte.

Alternatively, as a different method for producing the electrolyte, the following method can be mentioned. Firstly, components for constituting the electrical insulation layer are blended to produce an electrical insulation layer composition, and the electrical insulation layer composition is molded into a desired shape, followed by drying, thereby forming an electrical insulation layer. Subsequently, components for constituting the ion conductive composition are blended to produce an ion conductive composition, and the ion conductive composition is allowed to come into contact with the electrical insulation layer obtained in advance by a method such as coating. Further, if desired, in the state where the electrical insulation layer is in contact with the ion conductive composition, the electrical insulation layer and the ion conductive composition are simultaneously subjected to heat treatment or a pressure reduction treatment, so as to impregnate the ion conductive composition in the pores of the electrical insulation layer, thereby producing the electrolyte. The heat treatment can be conducted at a temperature of 60 to 100° C.

In the production of the electrolyte, when the components are blended, it is preferable to sufficiently mix the components by various methods.

The components may be sequentially added and mixed, or all of the components may be added and then mixed, so as to uniformly dissolve or disperse the blended components.

The mixing method of the components is not particularly limited, and a conventional method using an agitation blade, a ball mill, a stirrer, an ultraviolet disperser, an ultraviolet homogenizer, a planetary centrifugal mixer or the like is applicable.

The mixing conditions such as the mixing temperature and the mixing time can be appropriately selected depending on various methods, but in general, the temperature during the mixing is preferably 15 to 35° C. The mixing time can be appropriately adjusted depending on the temperature during mixing.

The electrolyte can be obtained by a method in which the electrolyte is formed on a support made of a suitable material. In a preferable production method of the battery device using such a method, for example, the electrolyte is formed on a surface of a support which has been subjected to a mold release treatment. Then, the electrolyte is released from the support, and moved to be disposed at a desired position in the battery device, thereby obtaining a battery device.

Alternatively, instead of the electrolyte, the electrical insulation layer is formed on a support, preferably on a surface which has been subjected to a mold release treatment. Then, the electrical insulation layer is released from the support, and moved to be disposed at a desired position in the battery device. Thereafter, the ion conductive composition is impregnated in the pores of the electrical insulation layer by the above method, so as to form the electrolyte inside the battery device, thereby obtaining a battery device.

Here, an example in which the electrolyte or the electrical insulation layer formed on the support is moved and disposed at a desired position in the battery device has been described. As an example of other method, there can be mentioned a method in which the electrolyte or the electrical insulation layer is directly formed on the electrode surface, instead of using the support, thereby producing a battery device in which the electrolyte is provided on the electrode surface of either or both of the anode and the cathode. In this method, since it is not necessary to prepare a substrate, and the operation of moving the electrolyte or the electrical insulation layer formed on the support to the inside of the battery device becomes unnecessary. As such, a battery device can be more efficiently produced.

EXAMPLES

As follows is a description of Examples of the present invention, although the scope of the present invention is in no way limited by these Examples.

Herebelow, the concentration unit "M" means "mol/L".

The microparticles composed of polymethylurea used in the present Examples are polymethylurea pigments "PERGOPAK M6" manufactured by Albemarle Corporation, and have the following characteristics.

Average particle diameter: about 3.5 µm to 6.5 µm (Primary particle diameter: 0.1 to 0.5 µm)
Surface area: 14 to 22 $m^2/g$
Oil absorption: 2.40 ml/g
Pore volume: 2.40 ml/g
Internal porosity: 78 vol %.

Example 1-1

Production of Electrical Insulation Layer 20 g of the polymethylurea was dispersed in 80 g of a deionized water while applying a medium shear force, thereby obtaining a slurry. In the slurry, microparticles (average particle diameter: about 3.5 µm to 6.5 µm) composed of polymethylurea agglomerated were dispersed. Hereafter, these microparticles are sometimes referred to as PMU microparticles.

4 g of polyvinylalcohl (manufactured by Sigma-Aldrich, average molecular weight: 146,000 to 186,000, 87 to 89% hydrolysis) was dissolved in the deionized water in advance, thereby preparing a 10 wt % aqueous solution. Then, the polymethylurea slurry and the polyvinyl alcohol aqueous solution were mixed together, followed by stirring mildly with a magnetic stirrer for 10 minutes. The operation heretofor was conducted at 25° C.

Using a No. 50 Meyer Rod, the above obtained mixture (electrical insulation layer composition) was coated on a copper foil with a thickness of 25 µm. Then, the coating film was dried at 120° C. for 10 minutes using an oven, followed by further drying at 80° C. for 2 hours using a vacuum oven, thereby obtaining an electrical insulation layer (thickness: 15 µm) in the form of a dried coating film.

The mechanical strength of the obtained electrical insulation layer was evaluated by a peel test using an adhesive tape, Scotch Magic Tape 810. Specifically, the state of the electrical insulation layer after peeling off the adhesive tape was visually observed, and evaluated with a criteria of 10 grades. In the case where the electrical insulation layer completely peeled off the copper foil, the film strength was graded 1. The smaller the level of the peeling the value of the film strength was increased, and in the case where the electrical insulation layer barely peeled off, the film strength was graded 10. In this manner, the evaluation was made.

Further, in the analysis of porosity and pore distribution, mercury porosimetry was used.

<Impregnation of Electrolyte Solution to Electrical Insulation Layer>

Ethylene carbonate (EC), succinonitrile (SCN) and polyethyleneglycol dimethylether (PEGdME) (average molecular weight: 1,000) was mixed with a ratio of EC:SCN:PEGdME=13:80:7 (weight ratio), thereby preparing a mixed solution. Lithium bis(trifluoromethanesulphonyl)imide (LiTFSI) was obtained in the mixed solution, thereby obtaining an electrolyte solution (ion conductive raw material composition) with a lithium ion concentration of 1.0 mol/L.

The obtained electrolyte solution was applied to the above obtained electrical insulation layer at 25° C., and allowed to stand for a predetermined time. Then, remaining composition of the surface was wiped off with Kimwipes, thereby producing an electrical insulation layer having an electrolyte solution impregnated (hereafter, sometimes referred to as "electrolyte").

<Evaluation of Ion Conductivity of Electrolyte>

Using "1260 Impedance/Gain-phase Analyzer" manufactured by Solartron, with respect to the obtained electrolyte, the ion conductivity in a temperature range of 25 to 100° C. was measured. As a result, the ion conductivity at 30° C. was $1.62 \times 10^{-3}$ S/cm.

Example 1-2

Production of Electrolyte 17 g of the polymethylurea was dispersed in 68 g of a deionized water while applying a medium shear force e, thereby obtaining a slurry. In the slurry, the PMU microparticles are dispersed.

4 g of polyvinylalcohl (manufactured by Sigma-Aldrich, average molecular weight: 146,000 to 186,000, 87 to 89% hydrolysis) was dissolved in the deionized water in advance, thereby preparing a 10 wt % aqueous solution.

Subsequently, the polymethylurea slurry was mixed with 10 g of an aqueous solution in which silica gel particles ("Sylojet 30A" manufactured by Grace Davison; silica average particle diameter: 0.3 μm; pore volume: 0.72 ml/g; silica surface area: 171 m$^2$/g; porosity: 61.3 vol %; internal pore size: 20 nm to 50 nm) as nanoparticles were dispersed with a concentration of 30 wt %. Further, the above polyvinyl alcohol aqueous solution was added thereto, followed by stirring mildly with a magnetic stirrer for 10 minutes. The operation heretofor was conducted at 25° C.

Using the above obtained mixture (electrical insulation layer composition), an electrical insulation layer in which the coating film was in a dried state was obtained in the same manner as in Example 1-1. The evaluation of the mechanical strength of the electrical insulation layer and the analysis of the porosity and the pore distribution were conducted in the same manner as in Example 1-1.

<Impregnation of Electrolyte Solution to Electrical Insulation Layer>

An electrolyte solution was prepared in the same manner as in Example 1-1, and the above obtained electrolyte solution was applied to the above obtained electrical insulation layer at 25° C., followed by the same procedure as in Example 1-1, thereby producing an electrical insulation layer having an electrolyte solution impregnated (electrolyte).

<Evaluation of Ion Conductivity of Electrolyte>

Using "1260 Impedance/Gain-phase Analyzer" manufactured by Solartron, with respect to the obtained electrolyte, the ion conductivity in a temperature range of 28 to 100° C. was measured. As a result, the ion conductivity at 30° C. was $1.18 \times 10^{-3}$ S/cm.

Example 1-3 to Example 1-20

Comparative Example 1-1 to Comparative Example 1-4

An electric insulation layer and an electrolyte in which microparticles and nanoparticles were blended with a weight ratio shown in the table below were produced in the same manner as in [Example 1-1] or [Example 1-2]. The evaluation of the mechanical strength of the electrical insulation layer, the analysis of the porosity and the pore distribution and the measurement of the ion conductivity of the obtained electrolyte were conducted in the same manner as in Example 1-1. The results are shown in the table below.

TABLE 1

|  | Microparticles (weight ratio) | Nanoparticles (weight ratio) | Binder solutions (weight ratio) | Total of weight ratio |
|---|---|---|---|---|
| Example 1-1 | PMU M6 (100) | — (0) | PVA aqueous solution (20) | 120 |
| Example 1-2 | PMU M6 (85) | SiO$_2$ A30 (15) | PVA aqueous solution (20) | 120 |
| Example 1-3 | PMU M6 (70) | SiO$_2$ A30 (30) | PVA aqueous solution (20) | 120 |
| Example 1-4 | PMU M6 (55) | SiO$_2$ A30 (45) | PVA aqueous solution (20) | 120 |
| Example 1-5 | PMU M6 (40) | SiO$_2$ A30 (60) | PVA aqueous solution (20) | 120 |
| Example 1-6 | PMU M6 (20) | SiO$_2$ A30 (80) | PVA aqueous solution (20) | 120 |
| Example 1-7 | PMU M6 (70) | SiO$_2$ A30 (30) | PVA aqueous solution (30) | 130 |
| Example 1-8 | PMU M6 (70) | SiO$_2$ A30 (30) | PVA aqueous solution (10) | 110 |
| Example 1-9 | SiO$_2$ W300 (70) | SiO$_2$ A30 (30) | PVA aqueous solution (30) | 130 |
| Example 1-10 | SiO$_2$ W300 (70) | pseudo-boehmite (30) | PVA aqueous solution (20) | 120 |
| Example 1-11 | PMU M6 (70) | pseudo-boehmite (30) | PVA aqueous solution (20) | 120 |
| Comparative Example 1-1 | PMU M6 (0) | SiO$_2$ A30 (100) | PVA aqueous solution (20) | 120 |
| Comparative Example 1-2 | — (0) | SiO$_2$ 22 nm (100) | PVA aqueous solution (30) | 130 |
| Comparative Example 1-3 | — (0) | SiO$_2$ 22 nm (100) | PVA aqueous solution (40) | 140 |
| Example 1-12 | PMU M6 (88) | — (0) | PAALi aqueous solution (12) | 100 |
| Example 1-13 | PMU M6 (62) SiO$_2$ C805 (26) | — (0) | PAALi aqueous solution (12) | 100 |

TABLE 1-continued

| | Microparticles (weight ratio) | Nanoparticles (weight ratio) | Binder solutions (weight ratio) | Total of weight ratio |
|---|---|---|---|---|
| Example 1-14 | PMU M6 (26) SiO$_2$ C805 (62) | — (0) | PAALi aqueous solution (12) | 100 |
| Example 1-15 | SiO$_2$ C805 (88) | — | PAALi aqueous solution (12) | 100 |
| Example 1-16 | PMU M6 (62) | Al$_2$O$_3$ APA-0.4AFP (26) | PAALi aqueous solution (12) | 100 |
| Example 1-17 | PMU M6 (26) | Al$_2$O$_3$ APA-0.4AFP (62) | PAALi aqueous solution (12) | 100 |
| Comparative Example 1-4 | — (0) | Al$_2$O$_3$ APA-0.4AFP (88) | PAALi aqueous solution (12) | 100 |
| Example 1-18 | PMU M6 (62) Al$_2$O$_3$·xH$_2$O DISPERAL 100 (26) | — (0) | PAALi aqueous solution (12) | 100 |
| Example 1-19 | PMU M6 (26) Al$_2$O$_3$·xH$_2$O DISPERAL 100 (62) | — (0) | PAALi aqueous solution (12) | 100 |
| Example 1-20 | Al$_2$O$_3$·xH$_2$O DISPERAL 100 (88) | — (0) | PAALi aqueous solution (12) | 100 |

In Table 1, the weight ratio of each component is the relative ratio of each component in each example, and the values are comparable with other examples.

In Table 1, the microparticles "PMU M6" is the aforementioned polymethylurea pigment "PERGOPAK M6".

In Table 1, the nanoparticles "SiO$_2$ A30" is the aforementioned silica gel particles "Sylojet 30A".

In Table 1, the microparticles "SiO$_2$ W300" is "Sylojet W300" (product name) manufactured by Grace Davison (silica average particle diameter: 5 to 6 μm; pore volume: 1.22 ml/g; silica surface area: 300 m$^2$/g; porosity: 72.9 vol %; internal pore size: 18 nm).

In Table 1, the nanoparticle "pseudo-boehmite" is "Dispal 11N7-80" (product name) manufactured by Sasol Limited (average particle diameter: 220 nm; surface area: 100 m$^2$/g).

In Table 1, the nanoparticles "SiO$_2$ 22 nm" is "Ludox TMA" (product name) manufactured by Grace Davison (silica average particle diameter: 22 nm; silica surface area: 130 m$^2$/g; no pores inside particles).

In Table 1, the nanoparticles "Al$_2$O$_3$(APA-0.4AFP)" (wherein "APA-0.4AFP" is a product name) is an alumina product manufactured by Sasol Limited (alumina average particle diameter: 320 nm; alumina surface area: 8.3 m$^2$/g; porosity: 46 vol %; no pores inside particles.

In Table 1, the microparticles Al$_2$O$_3$·xH$_2$O (DISPERAL100) (wherein "DISPERAL100" is a product name) is a pseudo-boehmite product manufactured by Sasol Limited (crystallite size (120): 100 nm, dispersed average particle diameter: 0.5-1.5 μm; surface area: 5-15 m$^2$/g).

In Table 1, the microparticles "SiO$_2$ C805" is "SYLOID C805" (product name) manufactured by Grace Davison (silica average particle diameter: 5 μm; silica surface area: 330 m$^2$/g; pore volume: 2.0 ml/g; porosity: 81 vol %).

In Table 1, the "PAALi aqueous solution" is an aqueous solution obtained by substituting carboxy groups of polyacrylic acid (weight average molecular weight: 250,000) (manufactured by Sigma-Aldrich Co. LLC. and provided in the form of an aqueous solution) with a lithium hydroxide monohydrate (manufactured by Wako Pure Chemical Industries, Ltd.), wherein the substitution ratio of the carboxy groups is 20 mol %.

TABLE 2

| | Ion conductivity (S/cm) | Film strength (relative value) | Porosity (vol %) | Meso porosity (vol %) | Macro porosity (vol %) | PC impregnation ratio (%) |
|---|---|---|---|---|---|---|
| Example 1-1 | 1.62E−03 | 4 | 76.13 | 7.75 | 68.38 | 266 |
| Example 1-2 | 1.18E−03 | 4 | 71.01 | 10.81 | 60.20 | 196 |
| Example 1-3 | 1.26E−03 | 8 | 68.80 | 15.70 | 53.10 | 169 |
| Example 1-4 | 7.81E−04 | 10 | 63.24 | 23.80 | 39.44 | 126 |
| Example 1-5 | 8.47E−04 | 10 | 64.15 | 30.67 | 33.48 | 125 |
| Example 1-6 | 9.42E−04 | 6 | 62.30 | 39.12 | 23.18 | 108 |
| Example 1-7 | 6.71E−04 | 9 | 64.59 | 15.60 | 48.99 | 142 |
| Example 1-8 | 1.34E−03 | 6 | 72.47 | 15.80 | 56.67 | 198 |
| Example 1-9 | 8.62E−04 | 4 | 79.54 | 21.46 | 58.08 | 246 |
| Example 1-10 | 1.60E−03 | 4 | 63.05 | 39.12 | 23.93 | 163 |
| Example 1-11 | 8.98E−04 | 10 | 56.60 | 8.67 | 47.94 | 145 |

TABLE 2-continued

| | Ion conductivity (S/cm) | Film strength (relative value) | Porosity (vol %) | Meso porosity (vol %) | Macro porosity (vol %) | PC impregnation ratio (%) |
|---|---|---|---|---|---|---|
| Comparative Example 1-1 | 6.42E−04 | 1 | 67.61 | 50.23 | 17.38 | 127 |
| Comparative Example 1-2 | 3.81E−05 | 10 | 27.50 | 1.85 | 25.65 | 24 |
| Comparative Example 1-3 | 3.00E−06 | 10 | 3.66 | 1.85 | 1.81 | 2 |
| Example 1-12 | 1.00E−03 | 7 | 73.58 | 7.97 | 65.60 | 234 |
| Example 1-13 | 2.96E−03 | 9 | 78.38 | 19.56 | 58.82 | 279 |
| Example 1-14 | 2.53E−03 | 9 | 77.64 | 37.14 | 40.50 | 234 |
| Example 1-15 | 2.24E−03 | 10 | 71.37 | 49.70 | 21.68 | 150 |
| Example 1-16 | 2.87E−03 | 10 | 88.75 | 12.64 | 76.11 | 352 |
| Example 1-17 | 1.45E−03 | 10 | 64.57 | 19.21 | 45.37 | 97 |
| Comparative Example 1-4 | 3.42E−04 | 2 | 57.52 | 23.11 | 34.41 | 80 |
| Example 1-18 | 2.69E−03 | 9 | 86.00 | 13.33 | 72.67 | 324 |
| Example 1-19 | 2.37E−03 | 10 | 85.05 | 21.15 | 63.90 | 404 |
| Example 1-20 | 5.10E−04 | 9 | 44.03 | 28.69 | 15.33 | 66 |

In Table 2, with respect to the values of the ion conductivity, "E-03" represents "×$10^{-3}$", "E-04" represents "×$10^{-4}$", "E-05" represents "×$10^{-5}$", and "E-06" represents "×$10^{-6}$".

In Table 2, the relative value of the film strength indicates the 10-grade criteria described above.

In Table 2, the porosity (vol %), meso porosity (vol %) and the macro porosity (vol %) respectively represent the proportion occupied by pores, the proportion occupied by meso pores and the proportion occupied by macro pores based on 100 vol % of the electrical insulation layer produced in each example, as measured by mercury porosimetry. The porosity is the sum of the meso porosity and the macro porosity. "Macro pores" are pores larger than meso pores, and in the present specification, refer to pores having a diameter larger than 50 nm. The macro pores may be within the fine particles, or may be formed as voids between particles constituting the electrical insulation layer.

In Table 2, the PC impregnation ratio indicates the proportion of increase in the weight of the electrical insulation layer when propylene carbonate (PC) is impregnated in the electrical insulation layer produced in each example. The proportion of increase in the weight of the electrical insulation layer is calculated by the following formula. Proportion of increase in weight={(Weight of electrical insulation layer after PC impregnation)−(Weight of electrical insulation layer before PC impregnation)}/(Weight of electrical insulation layer after PC impregnation)×100

The method of impregnating PC in the electrical insulation layer is as follows.

Each electrical insulation layer produced in Examples and Comparative Examples were immersed in PC at 25° C. for a predetermined time. After sufficiently impregnating PC in the electrical insulation layer by a capillary action, the electrical insulation layer was taken out of PC, and excess solvent was wiped off the surface.

The weight of electrical insulation layer before PC impregnation and the weight of electrical insulation layer after PC impregnation were measured, and used in the calculation of the proportion of increase in weight.

In [Example 1-1] to [Example 1-11] according to the present invention shown in Tables 1 and 2, each electrical insulating layer exhibited an ion conductivity as high as 4.00E-04 (4.00×$10^{-4}$ S/cm) or more, and an excellent mechanical strength with a film strength of 4 or more.

From these results, it is apparent that, by using the electrical insulation layer of the present invention as a separator for a lithium ion secondary battery, a lithium ion secondary battery with excellent capacity retention, mechanical strength and energy density can be obtained.

On the other hand, with respect to the electrical insulation layer of [Comparative Example 1-1] containing no micropores, there was a problem in that the mechanical strength in terms of the film strength was markedly low.

Further, with respect to the electrical insulation layers of [Comparative Example 1-2] and [Comparative Example 1-3] containing no micropores, since only nanoparticles with small particle diameter were used, there were problems in that the porosity was low, and the ion conductivity and the PC impregnation ratio were markedly low.

With respect to the electrical insulating layers obtained in [Example 1-12] to [Example 1-15] according to the present invention shown in Tables 1 and 2, both of the ion conductivity and the mechanical strength are satisfactory high. This means that even if the microparticles are primary particles, the effects of the present invention can be achieved as long as the microparticles have a mesoporous structure.

Also in the case of the electrical insulating layers obtained in [Example 1-16] and [Example 1-17] according to the present invention shown in Tables 1 and 2, both of the ion conductivity and the mechanical strength are satisfactory high. This means that even if the nanoparticles having a mesoporous structure are alumina particles instead of silica particles, the effects of the present invention can be achieved. However, as can be seen from the results of Comparative Example 1-4, a sufficient ion conductivity cannot be achieved when the nanoparticles of alumina having a mesoporous structure is used alone without the polymethylurea pigment (PMU M6).

Further, also in the case of the electrical insulating layers obtained in [Example 1-18] to [Example 1-20] according to the present invention shown in Tables 1 and 2, both of the ion conductivity and the mechanical strength are satisfactory high. This means that the use of microparticles of pseudo-boehmite is also effective for achieving the excellent effects of the present invention.

Example 2-1

The electrical insulation layer produced in [Example 1-1] was immersed in 1M LiTFSI dissolved in the mixture of EC:SCN:PEGdME=13:80:7 (weight ratio) liquid electrolyte solution at 25° C. for a predetermined time. After sufficiently impregnating liquid electrolyte solution in the electrical insulation layer by a capillary action, the electrical insulation layer was taken out of liquid electrolyte solution, and excess solution was wiped off the surface. Subsequently, the electrical insulation layer was placed on a Kimwipes, and a roll press was applied 10 times with a load of 2.1 kg/20 mm, followed by applying a roll press 10 times with a load of 13 kg/20 mm, thereby checking whether or not the liquid electrolyte solution retained inside the electrical insulation layer would be pushed out and move to the Kimwipes. As a result, the Kimwipes was in a dry state. Therefore, it was found that liquid electrolyte solution did not move to the Kimwipes and stably retained inside the electrical insulation layer.

Example 2-2

With the exception of using the electrical insulation layer obtained in [Example 1-3], the electrical insulation layer was evaluated in the same manner as in [Example 2-1]. As a result, the Kimwipes was in a dry state. Therefore, it was found that liquid electrolyte solution did not move to the Kimwipes and stably retained inside the electrical insulation layer.

Comparative Example 2-1

With the exception of using a commercially available Celgard2500 as a separator composed of a polypropylene porous film, the electrical insulation layer was evaluated in the same manner as in [Example 2-1]. As a result, liquid electrolyte solution was adhered to the Kimwipes. Therefore, it was found that liquid electrolyte solution had moved to the Kimwipes, and could not be stably retained inside a conventional separator.

The above results are shown in Table 3.

TABLE 3

| | Example in which electrical insulation layer was produced | Liquid electrolyte retention | Porosity (vol %) | Meso porosity (vol %) | Macro porosity (vol %) | PC impregnation ratio (%) |
|---|---|---|---|---|---|---|
| Example 2-1 | Example 1-1 | Excellent | 76.13 | 7.75 | 68.38 | 266 |
| Example 2-2 | Example 1-3 | Excellent | 68.80 | 15.70 | 53.10 | 169 |
| Comparative Example 2-1 | Commercially available product | Poor | 55 | — | 55 | No measured |

As seen from the results shown in Table 3, with respect to an electrical insulation layer having mesopores, in both [Example 2-1] and [Example 2-2], no adhering of the liquid electrolyte solution to the Kimwipes was observed. On the other hand, in a PP separator, adhering of the liquid electrolyte solution to the Kimwipes was observed.

From the above, it can be seen that the presence of mesopores are important in the retention of the liquid electrolyte solution.

Example 3-1

Production of Electrical Insulation Layer Composition

An electrical insulation layer was produced in the same manner as in [Example 1-3].

<Production of Anode>

80 parts by weight of graphite, 15 parts by weight of hard carbon and 5 parts by weight of polyvinylidene difluoride (PVDF) were mixed together to prepare an anode mixture. The anode mixture was dispersed in N-methylpyrrolidone (NMP), thereby preparing an anode mixture slurry (anode mixture composition). Then, the anode mixture slurry was coated on both sides of a copper foil having a thickness of 15 μm, and dried under reduced pressure at 100° C. under a pressure of −0.1 MPa for 10 hours, followed by roll pressing, thereby obtaining an anode in which anode active material layers were formed on both sides of the copper foil. The obtained anode was cut so as to leave the laminated portion of the anode active material layer (104×62 mm) and the non-laminated portion of the anode active material layer (tab portion; about 2×2 cm).

<Production of Cathode>

93 parts by weight of lithium nickel cobalt manganese oxide, 3 parts by weight of polyvinylidene difluoride (PVDF) and 4 parts by weight of carbon black as a conductive assistant were mixed together to prepare a cathode mixture. The cathode mixture was dispersed in N-methylpyrrolidone (NMP), thereby preparing a cathode mixture slurry (cathode mixture composition). Then, the cathode mixture slurry was coated on both sides of an aluminum foil having a thickness of 15 μm, and dried under reduced pressure at 100° C. under a pressure of −0.1 MPa for 10 hours, followed by roll pressing, thereby obtaining a cathode in which cathode active material layers were formed on both sides of the aluminum foil. The obtained anode was cut so as to leave the laminated portion of the anode active material layer (102×60 mm) and the non-laminated portion of the anode active material layer (tab portion; about 2×2 cm).

<Production of Electrical Insulation Layer>

Using a No. 50 Meyer Rod, the above obtained electrical insulation layer composition was coated on both sides of the anode and the cathode after cutting. Then, drying was conducted at 25° C. for 1 hour, followed by drying at 100° C. for 12 hours using a vacuum oven, thereby forming an electrical insulation layer on each of the anode and the cathode. The obtained electrical insulation layer had a thickness of 4 μm.

<Production of Electrolyte and Lithium Ion Secondary Battery>

Lithium oxalate-boron trifluoride was dissolved in a mixture of succinonitrile (SCN) and ethylene carbonate (EC) (SCN:EC=90:10, weight ratio), so as to obtain an electrolyte solution with a lithium ion concentration of 1.0 mol/kg.

Subsequently, the electrolyte solution heated to 80° C. was coated on the electrical insulation layers on both sides of the cathode and the anode using a bar coater, thereby forming an electrolyte on each electrode.

Thereafter, the anode and the cathode were superimposed such that the electrolytes faced each other. The tab terminals of the electrodes were protruded to the outer direction of the anode and the cathode, and each tab was weld by ultrasonic welding, thereby obtaining an electrode laminate.

Next, an aluminum laminate film was arranged such that the terminal tabs protruding from the anode and the cathode of the electrode laminate protruded outside. The outer periphery of the film was subjected to laminate processing so as to seal the electrode laminate, thereby producing a lithium ion secondary battery in the form of a laminate cell.
<Evaluation of Charging/Discharging Properties of Lithium Ion Secondary Battery>

With respect to the above lithium ion secondary battery, a constant current/constant voltage charging was conducted at 25° C. with 0.2 C (applied current/rated capacity of battery) until the current settled to 0.1 C with a limit voltage of 4.2V. Then, a constant current discharging of 0.2 C was conducted to 2.7V. Thereafter, a charging/discharging cycle with 1 C was repeatedly conducted, and the volume retention at the 100th cycle ([discharge capacity at 100th cycle (mAh)]/[discharge capacity at 1st cycle (mAh)])×100(%) was calculated, and was found to be 98%.

Example 3-2

Production of Electrolyte and Lithium Ion Secondary Battery

With the exception of using a mixture of succinonitrile (SCN) and ethylene carbonate (EC) (SCN:EC=80:20, weight ratio) instead of a mixture of succinonitrile (SCN) and ethylene carbonate (EC) (SCN:EC=90:10, weight ratio) in the production of an ion conductive raw material composition, a lithium ion secondary battery was produced in the same manner as in [Example 3-1].
<Evaluation of Charging/Discharging Properties of Lithium Ion Secondary Battery>

With respect to the above lithium ion secondary battery, the volume retention at 100th cycle ([discharge capacity at 100th cycle (mAh)]/[discharge capacity at 1st cycle (mAh)])×100(%) was calculated in the same manner as in [Example 3-1], and was found to be 97%.

Example 3-3

Production of Electrolyte and Lithium Ion Secondary Battery

With the exception of using lithium bis(trifluoromethanesulfonyl)imide (LITFSI) instead of lithium oxalate-boron trifluoride, a lithium ion secondary battery was produced in the same manner as in [Example 3-1].
<Evaluation of Charging/Discharging Properties of Lithium Ion Secondary Battery>

With respect to the above lithium ion secondary battery, the volume retention at 100th cycle ([discharge capacity at 100th cycle (mAh)]/[discharge capacity at 1st cycle (mAh)])×100(%) was calculated in the same manner as in [Example 3-1], and was found to be 90%.

Example 3-4

Production of Electrolyte and Lithium Ion Secondary Battery

With the exception of using lithium bis(trifluoromethanesulfonyl)imide (LITFSI) instead of lithium oxalate-boron trifluoride, a lithium ion secondary battery was produced in the same manner as in [Example 3-2].
<Evaluation of Charging/Discharging Properties of Lithium Ion Secondary Battery>

With respect to the above lithium ion secondary battery, the volume retention at 100th cycle ([discharge capacity at 100th cycle (mAh)]/[discharge capacity at 1st cycle (mAh)])×100(%) was calculated in the same manner as in [Example 3-1], and was found to be 91%.

Comparative Example 3-1

Production of Anode, Cathode and Electrolyte Solution

An anode, a cathode and an electrolyte solution were produced in the same manner as in [Example 3-1].
<Production of Electrolyte and Lithium Ion Secondary Battery>

The electrolyte solution heated to 80° C. was coated on both sides of the cathode and the anode using a bar coater.

Subsequently, the anode and the cathode were superimposed via a separator ("TBL4620" manufactured by Nippon Kodoshi Corporation; thickness: 20 μm), such that the faces coated with the electrolyte solution face each other. The tab terminals of the electrodes were protruded to the outer direction of the anode and the cathode, and each tab was weld by ultrasonic welding, thereby obtaining an electrode laminate.

Next, an aluminum laminate film was arranged such that the terminal tabs protruding from the anode and the cathode of the electrode laminate protruded outside. The outer periphery of the film was subjected to laminate processing so as to seal the electrode laminate, thereby producing a lithium ion secondary battery in the form of a laminate cell.
<Evaluation of Charging/Discharging Properties of Lithium Ion Secondary Battery>

With respect to the above lithium ion secondary battery, the volume retention at 40th cycle ([discharge capacity at 40th cycle (mAh)]/[discharge capacity at 1st cycle (mAh)])×100(%) was calculated in the same manner as in [Example 3-1], and was found to be 25%.

Comparative Example 3-2

Production of Anode, Cathode and Electrolyte Solution

An anode, a cathode and an electrolyte solution were produced in the same manner as in [Example 3-2].

The electrolyte solution heated to 80° C. was coated on both sides of the cathode and the anode using a bar coater.

Subsequently, the anode and the cathode were superimposed via a separator ("TBL4620" manufactured by Nippon Kodoshi Corporation; thickness: 20 μm), such that the faces coated with the electrolyte solution face each other. The tab terminals of the electrodes were protruded to the outer direction of the anode and the cathode, and each tab was weld by ultrasonic welding, thereby obtaining an electrode laminate.

Next, an aluminum laminate film was arranged such that the terminal tabs protruding from the anode and the cathode of the electrode laminate protruded outside. The outer periphery of the film was subjected to laminate processing so as to seal the electrode laminate, thereby producing a lithium ion secondary battery in the form of a laminate cell.
<Evaluation of Charging/Discharging Properties of Lithium Ion Secondary Battery>

With respect to the above lithium ion secondary battery, the volume retention at 40th cycle ([discharge capacity at 40th cycle (mAh)]/[discharge capacity at 1st cycle (mAh)])× 100(%) was calculated in the same manner as in [Example 3-1], and was found to be 91%.

Comparative Example 3-3

Production of Anode, Cathode and Electrolyte Solution

An anode, a cathode and an electrolyte solution were produced in the same manner as in [Example 3-3].
<Production of Electrolyte and Lithium Ion Secondary Battery>

The electrolyte solution heated to 80° C. was coated on both sides of the cathode and the anode using a bar coater.

Subsequently, the anode and the cathode were superimposed via a separator ("TBL4620" manufactured by Nippon Kodoshi Corporation; thickness: 20 μm), such that the faces coated with the electrolyte solution face each other. The tab terminals of the electrodes were protruded to the outer direction of the anode and the cathode, and each tab was weld by ultrasonic welding, thereby obtaining an electrode laminate.

Next, an aluminum laminate film was arranged such that the terminal tabs protruding from the anode and the cathode of the electrode laminate protruded outside. The outer periphery of the film was subjected to laminate processing so as to seal the electrode laminate, thereby producing a lithium ion secondary battery in the form of a laminate cell.
<Evaluation of Charging/Discharging Properties of Lithium Ion Secondary Battery>

With respect to the above lithium ion secondary battery, the volume retention at 40th cycle ([discharge capacity at 40th cycle (mAh)]/[discharge capacity at 1st cycle (mAh)])× 100(%) was calculated in the same manner as in [Example 3-1], and was found to be 21%.

Comparative Example 3-4

Production of Anode, Cathode and Electrolyte Solution

An anode, a cathode and an electrolyte solution were produced in the same manner as in [Example 3-4].
<Production of Electrolyte and Lithium Ion Secondary Battery>

The electrolyte solution heated to 80° C. was coated on both sides of the cathode and the anode using a bar coater.

Subsequently, the anode and the cathode were superimposed via a separator ("TBL4620" manufactured by Nippon Kodoshi Corporation; thickness: 20 μm), such that the faces coated with the electrolyte solution face each other. The tab terminals of the electrodes were protruded to the outer direction of the anode and the cathode, and each tab was weld by ultrasonic welding, thereby obtaining an electrode laminate.

Next, an aluminum laminate film was arranged such that the terminal tabs protruding from the anode and the cathode of the electrode laminate protruded outside. The outer periphery of the film was subjected to laminate processing so as to seal the electrode laminate, thereby producing a lithium ion secondary battery in the form of a laminate cell.
<Evaluation of Charging/Discharging Properties of Lithium Ion Secondary Battery>

With respect to the above lithium ion secondary battery, the volume retention at 40th cycle ([discharge capacity at 40th cycle (mAh)]/[discharge capacity at 1st cycle (mAh)])× 100(%) was calculated in the same manner as in [Example 3-1], and was found to be 51%.

TABLE 4

| | Example in which electrical insulation layer was produced | Solvent of electrolyte solution (weight ratio) | Lithium salt | Volume retention (%) 100 cyc. | 40 cyc. |
|---|---|---|---|---|---|
| Example 3-1 | Example 1-3 | SCN:EC = 90:10 | Lithium oxalate-BF3 | 98 | — |
| Example 3-2 | Example 1-3 | SCN:EC = 80:20 | Lithium oxalate-BF3 | 97 | — |
| Example 3-3 | Example 1-3 | SCN:EC = 90:10 | LiTFSI | 90 | — |
| Example 3-4 | Example 1-3 | SCN:EC = 80:20 | LiTFSI | 91 | — |
| Comparative Example 3-1 | — | SCN:EC = 90:10 | Lithium oxalate-BF3 | — | 25 |
| Comparative Example 3-2 | — | SCN:EC = 80:20 | Lithium oxalate-BF3 | 81 | 91 |
| Comparative Example 3-3 | — | SCN:EC = 90:10 | LiTFSI | — | 21 |
| Comparative Example 3-4 | — | SCN:EC = 80:20 | LiTFSI | — | 51 |

In the table above, "100cyc." indicates the 100th cycle, and "40cyc." indicates the 40th cycle.

As seen from the results shown in Table 4, it is apparent that a lithium ion secondary battery provided with the electrical insulation layer of the present invention exhibits an excellent volume retention.

Example 4-1

Production of Anode and Cathode Having Electrical Insulation Layer Formed on Surface An anode and a cathode having an electrical insulation layer formed on the surface thereof were produced in the same manner as in [Example 3-1].

<Production of Electrolyte and Lithium Ion Secondary Battery>

Lithium bis(trifluoromethanesulfonyl)imide (LITFSI) was dissolved in a mixture of succinonitrile (SCN) and ethylene carbonate (EC) (SCN:EC=80:20, weight ratio), so as to obtain an electrolyte solution with a lithium ion concentration of 1.0 mol/kg.

Subsequently, the electrolyte solution heated to 80° C. was coated on the electrical insulation layers on both sides of the cathode and the anode using a bar coater, thereby forming an electrolyte on each electrode. A plurality of cathodes and anodes were prepared in the same manner.

Thereafter, the anodes and cathodes were alternatively superimposed such that the electrolytes faced each other. The total number of anodes superimposed was 10, and the total number of cathodes superimposed was 9.

The tab terminals of the electrodes were protruded to the outer direction of the anode and the cathode, and each tab was weld by ultrasonic welding, thereby obtaining an electrode laminate.

Next, an aluminum laminate film was arranged such that the terminal tabs protruding from the anode and the cathode of the electrode laminate protruded outside. The outer periphery of the film was subjected to laminate processing so as to seal the electrode laminate, thereby producing a lithium ion secondary battery in the form of a laminate cell.

<Safety Test (1): Overcharge Test>

With respect to the above lithium ion secondary battery, a constant current/constant voltage charging was conducted at 25° C. with 0.2 C until the current settled to 0.1 C with a limit voltage of 4.2V. Then, a constant current discharging of 0.2 C was conducted to 2.7V.

Thereafter, charging was conducted at a constant current of 3 C until the voltage reached 12V. When the battery did not change after charging up to 12V, the mode was changed to a constant voltage mode, and the current was settled while maintaining the voltage at 12V, and maintained for 15 minutes.

As a result, even after 15 minutes of constant voltage mode after reaching 12V, apart from a slight swelling of the cell, no smoke, fire, explosion or the like was observed. The maximum temperature of the cell during the test was 86° C.

TABLE 5

| Evaluation items | Swelling of cell | Smoke | Fire | Explosion | Maximum temperature |
|---|---|---|---|---|---|
| Results | Slightly swelled | No occurrence | No occurrence | No occurrence | 86° C. |

Example 4-2

Production of Anode and Cathode Having Electrical Insulation Layer Formed on Surface An anode and a cathode having an electrical insulation layer formed on the surface thereof were produced in the same manner as in [Example 3-1].

<Production of Electrolyte and Lithium Ion Secondary Battery>

With the exception of using a mixture of diethyl carbonate (DEC) and ethylene carbonate (EC) (DEC:EC=70:30, weight ratio) instead of a mixture of succinonitrile (SCN) and ethylene carbonate (EC) (SCN:EC=80:20, weight ratio) in the production of an ion conductive raw material composition, a lithium ion secondary battery was produced in the same manner as in [Example 4-1].

<Safety Test (2): Overcharge Test>

A safety test was performed in the same manner as in [Example 4-1]. As a result, swelling of the cell was observed just after reaching 12V, and a slight smoke was observed. However, no fire or explosion occurred. The maximum temperature of the cell during the test was 248° C.

TABLE 6

| Evaluation items | Swelling of cell | Smoke | Fire | Explosion | Maximum temperature |
|---|---|---|---|---|---|
| Results | Swelled | Slight smoke | No occurrence | No occurrence | 248° C. |

Comparative Example 4-1

Production of Anode and Cathode

An anode and a cathode having were produced in the same manner as in [Example 3-1]. No electrical insulation layer was formed on the surface of these anode and cathode.

<Production of Electrolyte and Lithium Ion Secondary Battery>

With the exception of using a mixture of diethyl carbonate (DEC) and ethylene carbonate (EC) (DEC:EC=70:30, weight ratio) instead of a mixture of succinonitrile (SCN) and ethylene carbonate (EC) (SCN:EC=80:20, weight ratio) in the production of an ion conductive raw material composition, and providing a polyolefin separator (PP; thickness: 15 μm) between the anode and the cathode, a lithium ion secondary battery was produced in the same manner as in [Example 4-1].

<Safety Test (2): Overcharge Test>

A safety test was performed in the same manner as in [Example 4-1]. As a result, swelling of the cell was observed just after reaching 12V, and smoke was observed. Thereafter, the battery caught fire. The maximum temperature of the cell during the test was 430° C.

TABLE 7

| Evaluation items | Swelling of cell | Smoke | Fire | Explosion | Maximum temperature |
|---|---|---|---|---|---|
| Results | Swelled | Occurred | Occurred | Narrowly escaped occurrence (danger of explosion) | 430° C. |

Example 4-3

Production of Anode and Cathode Having Electrical Insulation Layer Formed on Surface An anode and a cathode having an electrical insulation layer formed on the surface thereof were produced in the same manner as in [Example 3-1].

<Production of Electrolyte and Lithium Ion Secondary Battery>

A lithium ion secondary battery was produced in the same manner as in [Example 4-1].

<Safety Test (4): Crushing>

With respect to the above lithium ion secondary battery, a constant current/constant voltage charging was conducted at 25° C. with 0.2 C until the current settled to 0.1 C with a limit voltage of 4.2V. Then, a constant current discharging of 0.2 C was conducted to 2.7V. Then, a constant current/constant voltage charging was conducted again with 0.2 C until the current settled to 0.1 C with a limit voltage of 4.2V.

Figure 2:
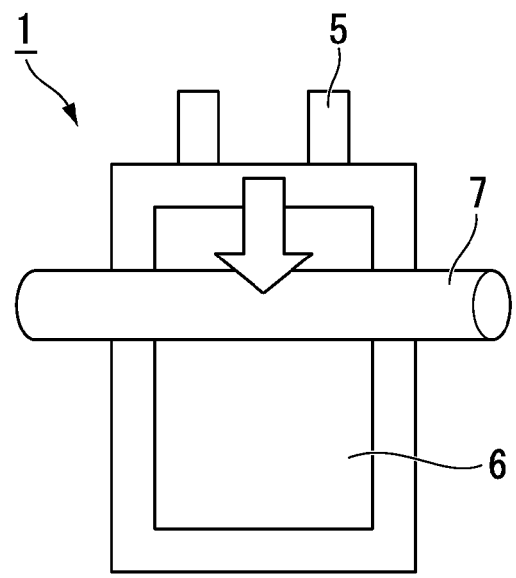
FIG. 2 is a schematic diagram showing the state of conducting a safety test (crushing test) of a lithium ion secondary battery produced in the present example.

FIG. 2 is a schematic diagram showing the state of conducting the safety test (crushing test) of the lithium ion secondary battery produced in the examples. As shown in FIG. 2, along the central portion of the lithium ion secondary battery 1 in a charged state, in parallel to the tab 5 and across the cell 6, an SUS rod 7 (φ10 mm; length: 20 cm) for the crushing test was used to crush the cell. The descending rate of the SUS rod was 0.1 mm/sec, and the maximum load was 20 kN.

As a result, after being crushed, the voltage gradually decreased. However, no swelling of the cell, smoke, fire, explosion or the like was observed. The maximum temperature of the cell during the test was 30° C.

TABLE 8

| Evaluation items | Swelling of cell | Smoke | Fire | Explosion | Maximum temperature |
|---|---|---|---|---|---|
| Results | No occurrence | No occurrence | No occurrence | No occurrence | 30° C. |

Example 4-4

Production of Anode and Cathode Having Electrical Insulation Layer Formed on Surface An anode and a cathode having an electrical insulation layer formed on the surface thereof were produced in the same manner as in [Example 3-1].

<Production of Electrolyte and Lithium Ion Secondary Battery>

A lithium ion secondary battery was produced in the same manner as in [Example 4-2].

<Safety Test (5): Crushing>

A safety test was performed in the same manner as in [Example 4-3].

As a result, after being crushed, the voltage gradually decreased. However, no swelling of the cell, smoke, fire, explosion or the like was observed. The maximum temperature of the cell during the test was 66° C.

TABLE 9

| Evaluation items | Swelling of cell | Smoke | Fire | Explosion | Maximum temperature |
|---|---|---|---|---|---|
| Results | No occurrence | No occurrence | No occurrence | No occurrence | 66° C. |

Comparative Example 4-2

Production of Anode and Cathode

An anode and a cathode having no electrical insulation layer were produced in the same manner as in [Example 3-1].

<Production of Electrolyte and Lithium Ion Secondary Battery>

With the exception of using a mixture of diethyl carbonate (DEC) and ethylene carbonate (EC) (DEC:EC=70:30, weight ratio) instead of a mixture of succinonitrile (SCN) and ethylene carbonate (EC) (SCN:EC=80:20, weight ratio) in the production of an ion conductive raw material composition, a lithium ion secondary battery was produced in the same manner as in [Comparative Example 4-1].

<Safety Test (6): Crushing>

A safety test was performed in the same manner as in [Example 4-3].

As a result, after being crushed, the voltage gradually decreased. Further, swelling of the cell, breaking of the cell and smoke was generated. The cell narrowly escaped from catching fire. The maximum temperature of the cell during the test was 95° C.

TABLE 10

| Evaluation items | Swelling of cell | Smoke | Fire | Explosion | Maximum temperature |
|---|---|---|---|---|---|
| Results | Swelled | Occured | Narrowly escaped occurrence (danger of fire) | No occurrence | 95° C. |

Example 4-5

Production of Anode and Cathode Having Electrical Insulation Layer Formed on Surface An anode and a cathode having an electrical insulation layer formed on the surface thereof were produced in the same manner as in [Example 3-1].

<Production of Electrolyte and Lithium Ion Secondary Battery>

A lithium ion secondary battery was produced in the same manner as in [Example 4-1].

<Safety Test (7): Heating>

With respect to the above lithium ion secondary battery, a constant current/constant voltage charging was conducted at 25° C. with 0.2 C until the current settled to 0.1 C with a limit voltage of 4.2V. Then, a constant current discharging of 0.2 C was conducted to 2.7V. Then, a constant current/constant voltage charging was conducted again with 0.2 C until the current settled to 0.1 C with a limit voltage of 4.2V.

The lithium ion secondary battery in a charged state was heated while gradually raising the temperature at a rate of 5° C./min. When the temperature reached 130° C., 150° C., 165° C. and 180° C., temperature was maintained for 10 minutes.

As a result, no change in the cell by the heating was observed.

TABLE 11

| Evaluation items | Swelling of cell | Smoke | Fire | Explosion | Internal short circuit |
|---|---|---|---|---|---|
| Results | No occurrence | No occurrence | No occurrence | No occurrence | No occurrence |

Example 4-6

Production of Anode and Cathode Having Electrical Insulation Layer Formed on Surface An anode and a cathode having an electrical insulation layer formed on the surface thereof were produced in the same manner as in [Example 3-1].
<Production of Electrolyte and Lithium Ion Secondary Battery>
A lithium ion secondary battery was produced in the same manner as in [Example 4-2].
<Safety Test (8): Heating>
A safety test was performed in the same manner as in [Example 4-5].
As a result, no change in the cell by the heating was observed.

TABLE 12

| Evaluation items | Swelling of cell | Smoke | Fire | Explosion | Internal short circuit |
|---|---|---|---|---|---|
| Results | No occurrence | No occurrence | No occurrence | No occurrence | No occurrence |

Comparative Example 4-3

Production of Anode and Cathode

An anode and a cathode having no electrical insulation layer were produced in the same manner as in [Example 3-1].
<Production of Electrolyte and Lithium Ion Secondary Battery>
With the exception of using a mixture of diethyl carbonate (DEC) and ethylene carbonate (EC) (DEC:EC=70:30, weight ratio) instead of a mixture of succinonitrile (SCN) and ethylene carbonate (EC) (SCN:EC=80:20, weight ratio) in the production of an ion conductive raw material composition, a lithium ion secondary battery was produced in the same manner as in [Comparative Example 4-1].
<Safety Test (9): Heating>
A safety test was performed in the same manner as in [Example 4-5].
As a result, a slight swelling of the cell by the heating was observed. Further, after reaching 80° C., the fluctuation in the voltage occurred, and at 165° C., the fluctuation of the voltage became vigorous. Specifically, the voltage dropped from 4.2V to 0V for a moment, and then returned to 4V. This unstable behavior of the voltage is presumed that the polypropylene separator was dissolved by heat, thereby causing a momentary internal short circuit.

TABLE 13

| Evaluation items | Swelling of cell | Smoke | Fire | Explosion | Internal short circuit |
|---|---|---|---|---|---|
| Results | Slightly swelled | No occurrence | No occurrence | No occurrence | Occurred |

Summarizing the results of the safety tests above, in the case where a conventional polyolefin separator is used, problem occurred such as overcharging, crushing, and smoke, fire, internal short circuit and the like when heated. In contrast, in a lithium ion secondary battery provided with the electrical insulation layer according to a first aspect of the present invention, particularly in the case where an electrolyte solution containing a nitrile solvent is used, problems of smoke, fire, internal short circuit and the like did not occur.

<Relation Between Porosity of Electrical Insulation Layer and Ion Conductivity>

Figure 3:
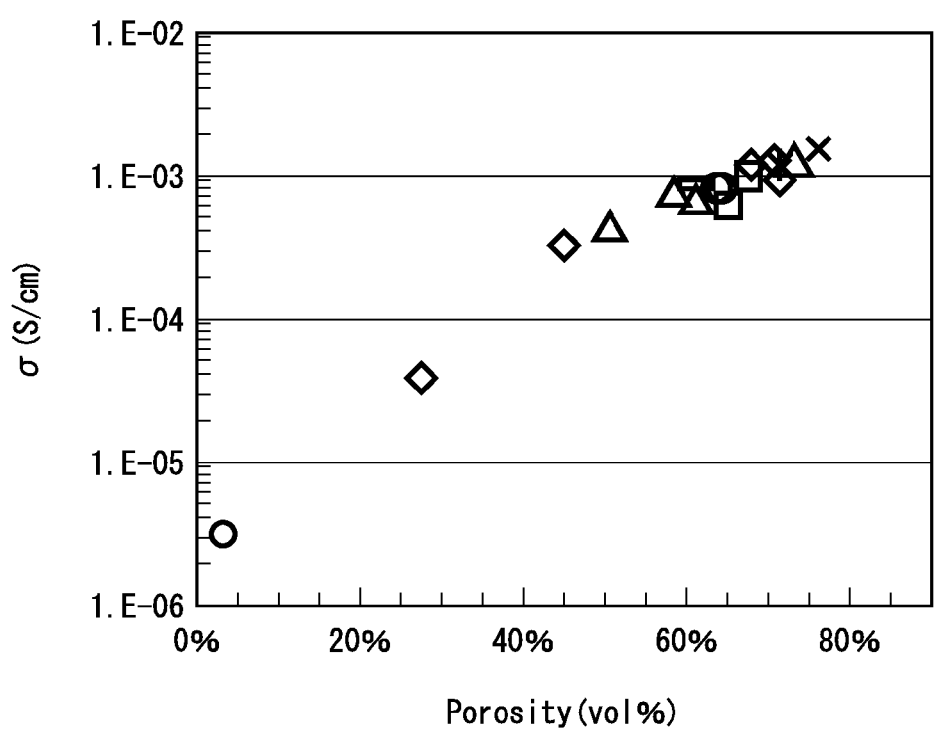
FIG. 3 is a plotted graph showing the relation between the porosity and the ion conductivity with respect to a plurality of electrical insulation layers produced by blending the microparticles and/or the nanoparticles with various proportions.

FIG. 3 is a plotted graph showing the relation between the porosity and the ion conductivity with respect to a plurality of electrical insulation layers produced in the same manner as in the above examples by blending the microparticles and/or the nanoparticles with various proportions. It is apparent that the ion conductivity (S/cm) correlates with the porosity, regardless of the types and proportions of the particles constituting the electrical insulation layers. From the results of FIG. 3, it is preferable that the porosity of the electrical insulation layer is adjusted to 30 vol % or more in order to obtain an ion conductivity of $1 \times 10^{-4}$ S/cm or more.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention is applicable to the fields of various battery devices such as lithium ion secondary battery.

DESCRIPTION OF REFERENCE NUMERALS

1: Battery device, 2: Electrolyte, 3: Anode, 4: Cathode, 5: tab (wiring), 6: cell (main body), 7: SUS rod for crushing test

What is claimed is:

1. An electrical insulation layer having a mesoporous structure and comprising:
   microparticles having an average particle diameter of 0.5 μm to 40 μm,
   nanoparticles having an average particle diameter of 3 nm to less than 500 nm,
   a binder, and
   an ion conductive composition;
   wherein said microparticles comprise particles of polymethylurea, said nanoparticles comprise particles of aluminum oxide, and said binder comprises lithium polyacrylate.

2. The electrical insulation layer according to claim 1, wherein the proportion of pores based on the total volume of the electrical insulation layer is 30 to 90 vol %.

3. The electrical insulation layer according to claim 1, wherein the proportion of mesopores based on the total volume of the electrical insulation layer is 3 to 65 vol %.

4. The electrical insulation layer according to claim 1, wherein at least one of the microparticles and the nanoparticles has a mesoporous structure.

5. A battery device comprising:
   a cathode;
   an anode;
   an electrical insulation layer of claim 1, having a mesoporous structure, the electrical insulation layer being arranged between the anode and the cathode; and
   an ion conductive composition;

wherein at least one of the microparticles and the nanoparticles has a mesoporous structure.

6. The battery device according to claim 5, wherein the proportion of pores based on the total volume of the electrical insulation layer is 30 to 90 vol %.

7. The battery device according to claim 5, wherein the proportion of mesopores based on the total volume of the electrical insulation layer is 3 to 65 vol %.

8. The battery device according to claim 5, wherein the ion conductive composition comprises a lithium salt and a non-aqueous solvent.

9. The battery device according to claim 8, wherein the lithium salt comprises an organic acid lithium-boron trifluoride complex represented by general formula (I) or (II) shown below:

  (I)

  (II)

wherein R represents a hydrocarbon group having a valency of n or a hydride group; and n represents an integer of 1 to 4.

10. The battery device according to claim 9, wherein the organic acid lithium-boron trifluoride complex comprises at least one member selected from the group consisting of a lithium oxalate-boron trifluoride complex, a lithium succinate-boron trifluoride complex and a lithium formate-boron trifluoride complex.

11. The battery device according to claim 9, wherein the amount of the organic acid lithium-boron trifluoride complex based on the total amount of the lithium salt is 0.5 mol % or more.

12. The battery device according to claim 8, wherein the non-aqueous solvent comprises a nitrile solvent.

13. The battery device according to claim 12, wherein the nitrile solvent comprises at least one member selected from the group consisting of succinonitrile, glutaronitrile and adiponitrile.

14. The battery device according to claim 12, wherein the amount of the nitrile solvent based on the total amount of the non-aqueous solvent is 50 vol % or more.

15. The battery device according to claim 5, wherein the microparticles further comprise particles of at least one member selected from the group consisting of melamine formaldehyde resin, lithium polyacrylate, polyamide, poly(lithium 2-acrylamido-2-methylpropanesulfonate), silicon dioxide ($SiO_2$), aluminum oxide ($Al_2O_3$), pseudoboehmite (AlO(OH)), titanium dioxide ($TiO_2$), zinc oxide (ZnO), potassium fluoride (KF), lithium fluoride (LiF), zeolite and calcium carbonate ($CaCO_3$).

16. The battery device according to claim 5, wherein the nanoparticles further comprise particles of at least one member selected from the group consisting of silicon dioxide ($SiO_2$), pseudoboehmite (AlO(OH)), niobium oxide ($Nb_2O_5$), tantalum oxide ($Ta_2O_5$), titanium dioxide ($TiO_2$), zirconium oxide ($ZrO_2$), tin dioxide ($SnO_2$), zinc oxide (ZnO), potassium fluoride (KF), lithium fluoride (LiF), mesoporous aluminosilicate ($Al_2SiO_5$), a mesoporous niobium-tantalum composite oxide and a mesoporous magnesium-tantalum composite oxide.

17. The battery device according to claim 5, wherein the binder further comprises at least one member selected from the group consisting of polyvinyl alcohol, carboxyl group-modified polyvinyl alcohol, polyvinyl pyrrolidone, polyethylene oxide, polypropylene oxide, polyvinylidene fluoride, polyvinylidene fluoride-hexafluoropropylene copolymer, polyacrylic acid, poly(methyl methacrylate), poly(butyl acrylate), ethyl hydroxyethyl cellulose, styrene-butadiene resin, carboxymethyl cellulose, polyimide, polyacrylonitrile, polyurethane, ethyl-vinyl acetate copolymer and polyester.

18. The battery device according to claim 5, wherein the electrical insulation layer is formed on a surface of at least the anode or the cathode.

* * * * *